(12) United States Patent
Boon et al.

(10) Patent No.: US 7,702,017 B2
(45) Date of Patent: Apr. 20, 2010

(54) MOVING PICTURE ENCODING APPARATUS, MOVING PICTURE ENCODING METHOD, MOVING PICTURE ENCODING PROGRAM, MOVING PICTURE DECODING APPARATUS, MOVING PICTURE DECODING METHOD, AND MOVING PICTURE DECODING PROGRAM

(75) Inventors: Choong Seng Boon, Yokohama (JP); Thiow Keng Tan, Jalan Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 1341 days.

(21) Appl. No.: 11/104,530

(22) Filed: Apr. 13, 2005

(65) Prior Publication Data
US 2005/0232500 A1 Oct. 20, 2005

(30) Foreign Application Priority Data
Apr. 16, 2004 (JP) ............................ P2004-122100
Feb. 2, 2005 (JP) ............................ P2005-026926

(51) Int. Cl.
*H04N 7/12* (2006.01)
(52) U.S. Cl. .................. 375/240.12; 348/403
(58) Field of Classification Search ................ 348/408, 348/409.1, 410.1, 423.1, 699, 700, 384, 390, 348/400, 401, 420, 402, 403, 405, 411, 412, 348/415, 416, 424, 426, 441; 382/232, 233, 382/236, 238, 248, 250; 386/109, 111, 112; 375/240.12, 240.16, 240.29, 240.26, 240.14, 375/240.01, 240.13, 240.15
See application file for complete search history.

(56) References Cited

U.S. PATENT DOCUMENTS
5,539,663 A 7/1996 Agarwal
(Continued)

FOREIGN PATENT DOCUMENTS
EP 0 540 872 A1 5/1993
(Continued)

OTHER PUBLICATIONS
Joan Llach, et al., "H.264 encoder with low complexity noise pre-filtering", Proceedings of SPIE, Applications of Digital Image Processing XXVI, vol. 5203, XP-002292439, Jan. 1, 2003, pp. 478-489.
(Continued)

*Primary Examiner*—Behrooz Senfi
(74) *Attorney, Agent, or Firm*—Oblon, Spivak, McClelland, Maier & Neustadt, L.L.P.

(57) ABSTRACT

In a moving picture encoding apparatus 10, as an embodiment of the present invention, a predicted image generator 16 generates a predicted image with respect to a target image, using a reference image stored in a frame memory 20. A difference image generator 18 performs a difference operation between the target image and the predicted image to generate a difference image. An encoder 22 encodes the difference image to generate an encoded difference signal. A decoder 28 decodes the encoded difference signal to generate a decoded difference image. A reproduced image generator 30 performs a summation of the decoded difference image and the predicted image to generate a reproduced image. An image updater 32 performs a weighted summation of a first image which is one of the reproduced image and the reference image, and a second image which is the other of the reproduced image and the reference image, to generate an updated image. The updated image is stored into the frame memory 20 to be used as a reference image in encoding of another target image.

21 Claims, 17 Drawing Sheets

U.S. PATENT DOCUMENTS

| | | | |
|---|---|---|---|
| 6,175,592 B1 * | 1/2001 | Kim et al. | 375/240.16 |
| 6,775,326 B2 * | 8/2004 | Sekiguchi et al. | 375/240.14 |
| 6,956,901 B2 * | 10/2005 | Boroczky et al. | 375/240.03 |
| 7,085,322 B2 * | 8/2006 | Ngai et al. | 375/240.25 |
| 7,408,986 B2 * | 8/2008 | Winder | 375/240.12 |
| 2004/0057523 A1 | 3/2004 | Koto et al. | |

FOREIGN PATENT DOCUMENTS

| | | |
|---|---|---|
| JP | 5-37915 | 2/1993 |
| JP | 8-18977 | 1/1996 |
| JP | 9-93592 | 4/1997 |
| JP | 10-224799 | 8/1998 |
| JP | 2003-284075 | 10/2003 |
| KR | 2000-0064898 | 11/2000 |
| WO | WO 2005/009045 A1 | 1/2005 |

OTHER PUBLICATIONS

Thomas Wiegand, et al., "Long-Term Memory Motion-Compensated Prediction", IEEE Transactions on Circuits and Systems for Video Technology, vol. 9. No. 1, XP-011014548, Feb. 1, 1999, pp. 70-84.

* cited by examiner

MOVING PICTURE ENCODING APPARATUS, MOVING PICTURE ENCODING METHOD, MOVING PICTURE ENCODING PROGRAM, MOVING PICTURE DECODING APPARATUS, MOVING PICTURE DECODING METHOD, AND MOVING PICTURE DECODING PROGRAM

BACKGROUND OF THE INVENTION

1. Field of the Invention

The present invention relates to a moving picture encoding apparatus, a moving picture encoding method, a moving picture encoding program, a moving picture decoding apparatus, a moving picture decoding method, and a moving picture decoding program.

2. Related Background Art

The compression coding technologies are used in order to achieve efficient transmission and storage of a moving picture. One of the known compression coding technologies is the interframe coding method. In the interframe coding method, an image is divided into a plurality of blocks of a predetermined size and a coding process is carried out on a block-by-block basis. In this coding process, a reproduced image of another image adjacent in the time direction is used as a reference image, and a predicted image is generated with respect to a target image as an object to be encoded. Here the reproduced image is a reconstruction of an image coded prior to the target image. A difference image between this predicted image and the target image is encoded to reduce the volume of data of the moving picture (e.g., reference is made to Japanese Patent Application Laid-Open No. 9-93592).

SUMMARY OF THE INVENTION

Incidentally, a variety of noise components are generated in a reproduced image. If the reproduced image contains noise, it will degrade the quality as a reference image. As a result, the difference becomes large between the predicted image and the target image, so as to result in failure in sufficient reduction of data volume.

An object of the present invention is thus to provide a moving picture encoding apparatus, a moving picture encoding method, and a moving picture encoding program capable of reducing the noise in the reference image. Another object of the present invention is to provide a moving picture decoding apparatus, a moving picture decoding method, and a moving picture decoding program capable of decoding a moving picture from data generated by the foregoing moving picture encoding apparatus.

A moving picture encoding apparatus according to the present invention is an apparatus comprising: (a) predicted image generating means for generating a predicted image, with respect to a target image as an object to be encoded among a plurality of images constituting a moving picture; (b) difference image generating means for executing a difference operation between the target image and the predicted image to generate a difference image; (c) encoding means for encoding the difference image to generate an encoded difference signal; (d) decoding means for decoding the encoded difference signal to generate a decoded difference image; (e) reproduced image generating means for executing a sum operation of the decoded difference image and the predicted image to generate a reproduced image; (f) storing means for storing a reference image to be used by the predicted image generating means in order to generate the predicted image; and (g) image updating means for performing a weighted summation of a first image which is one of the reproduced image and the reference image stored in the storing means, and at least a portion of a second image which is the other of the reproduced image and the reference image, to generate an updated image, (h) wherein the image updating means stores the updated image into the storing means, and (i) wherein the predicted image generating means uses the updated image stored in the storing means, as a reference image for generating a predicted image with respect to another target image.

A moving picture encoding method according to another aspect of the present invention is a method comprising: (a) a predicted image generating step wherein predicted image generating means generates a predicted image, with respect to a target image as an object to be encoded among a plurality of images constituting a moving picture; (b) a difference image generating step wherein difference image generating means executes a difference operation between the target image and the predicted image to generate a difference image; (c) an encoding step wherein encoding means encodes the difference image to generate an encoded difference signal; (d) a decoding step wherein decoding means decodes the encoded difference signal to generate a decoded difference image; (e) a reproduced image generating step wherein reproduced image generating means executes a sum operation of the decoded difference image and the predicted image to generate a reproduced image; (f) a storing step wherein storing means stores a reference image to be used by the predicted image generating means in order to generate the predicted image; and (g) an image updating step wherein image updating means performs a weighted summation of a first image which is one of the reproduced image and a reference image stored in the storing means, and at least a portion of a second image which is the other of the reproduced image and the reference image, to generate an updated image, (h) wherein in the image updating step the image updating means stores the updated image into the storing means, and (i) wherein in the predicted image generating step the predicted image generating means uses the updated image stored in the storing means, as a reference image for generating a predicted image with respect to another target image.

A moving picture encoding program according to still another aspect of the present invention is a program for letting a computer function as: (a) predicted image generating means for generating a predicted image, with respect to a target image as an object to be encoded among a plurality of images constituting a moving picture; (b) difference image generating means for executing a difference operation between the target image and the predicted image to generate a difference image; (c) encoding means for encoding the difference image to generate an encoded difference signal; (d) decoding means for decoding the encoded difference signal to generate a decoded difference image; (e) reproduced image generating means for executing a sum operation of the decoded difference image and the predicted image to generate a reproduced image; (f) storing means for storing a reference image to be used by the predicted image generating means in order to generate the predicted image; and (g) image updating means for performing a weighted summation of a first image which is one of the reproduced image and the reference image stored in the storing means, and at least a portion of a second image which is the other of the reproduced image and the reference image, to generate an updated image. In this configuration, (h) the image updating means stores the updated image into the storing means, and (i) the predicted image generating means uses the updated image stored in the storing means, as a reference image for generating a predicted image with respect to another target image.

The present invention associated with the foregoing encoding of the moving picture involves performing the weighted summation of the first image which is one of the reproduced image and the reference image previously stored in the storing means, and the second image which is the other of the reproduced image and the reference image, to generate the updated image. This updated image is used as a reference image for generating a predicted image for another target image. Therefore, the present invention uses the reference image in which noise is reduced by averaging based on the summation, so as to reduce the data volume of the moving picture by encoding, thereby improving the encoding efficiency. Furthermore, the present invention generates the updated image resulting from averaging of the reproduced image and the reference image, whereby the updated image can reflect details of the image which are absent in the reproduced image or in the reference image. Therefore, the data volume of the moving picture by encoding is further reduced.

One of the various known noises generated in the reproduced image is noise caused by the block boundary effect of making a large change of pixel values at a boundary between blocks. A known technique for reducing the noise due to the block boundary effect is to apply a deblocking filter to the vicinity of the boundary between blocks in the reproduced image. However, the deblocking filter cannot reduce the noise caused inside a block. The present invention reduces the noise in the reference image by the averaging based on the summation, so as to reduce the noise inside the block.

Furthermore, the bidirectional prediction is known as a technique for reducing the quantization noise or the like which is one of the noise components generated in the reproduced image. In the bidirectional prediction, two motion amounts (first motion amount and second motion amount) are acquired for a processing target block. The first motion amount is an amount of motion of the processing target block to a forward reference image in the time direction. The second motion amount is an amount of motion of the processing target block to a backward reference image in the time direction. In the bidirectional prediction, a first predicted image is obtained from the first motion amount, a second predicted image is obtained from the second motion amount, and a predicted image obtained by averaging of the first predicted image and the second predicted image is used. However, this predicted image is used for a specific processing target block, but cannot be used as a reference image in subsequent processing of another processing target block. In the bidirectional prediction, therefore, the effect of reducing the noise by averaging is not utilized in subsequent processing. On the other hand, the present invention involves storing the updated image with noise reduced by averaging, as a reference image into the storing means and using the updated image for generation of a predicted image in subsequent processing. Therefore, the present invention also utilizes the effect of the noise reduction by averaging, in processing of another target image.

A moving picture decoding apparatus according to the present invention is an apparatus comprising: (a) decoding means for decoding an encoded difference signal resulting from predictive coding of a moving picture, to generate a decoded difference image; (b) predicted image generating means for generating a predicted image with respect to a target image as an object to be decoded, based on the encoded difference signal; (c) reproduced image generating means for performing a summation of the decoded difference image and the predicted image to generate a reproduced image; (d) storing means for storing a reference image to be used by the predicted image generating means in order to generate the predicted image; and (e) image updating means for performing a weighted summation of a first image which is one of the reproduced image and the reference image stored in the storing means, and at least a portion of a second image which is the other of the reproduced image and the reference image, to generate an updated image, (f) wherein the image updating means stores the updated image into the storing means, and (g) wherein the predicted image generating means uses the updated image stored in the storing means, as a reference image for generating a predicted image with respect to another target image.

A moving picture decoding method according to another aspect of the present invention is a method comprising: (a) a decoding step wherein decoding means decodes an encoded difference signal resulting from predictive coding of a moving picture, to generate a decoded difference image; (b) a predicted image generating step wherein predicted image generating means generates a predicted image with respect to a target image as an object to be decoded, based on the encoded difference signal; (c) a reproduced image generating step wherein reproduced image generating means performs a summation of the decoded difference image and the predicted image to generate a reproduced image; (d) a storing step wherein storing means stores a reference image to be used by the predicted image generating means in order to generate the predicted image; and (e) an image updating step wherein image updating means performs a weighted summation of a first image which is one of the reproduced image and the reference image stored in the storing means, and at least a portion of a second image which is the other of the reproduced image and the reference image, to generate an updated image, (f) wherein in the image updating step the image updating means stores the updated image into the storing means, and (g) wherein in the predicted image generating step the predicted image generating means uses the updated image stored in the storing means, as a reference image for generating a predicted image with respect to another target image.

A moving picture decoding program according to still another aspect of the present invention is a program for letting a computer function as: (a) decoding means for decoding an encoded difference signal resulting from predictive coding of a moving picture, to generate a decoded difference image; (b) predicted image generating means for generating a predicted image with respect to a target image as an object to be decoded, based on the encoded difference signal; (c) reproduced image generating means for performing a summation of the decoded difference image and the predicted image to generate a reproduced image; (d) storing means for storing a reference image to be used by the predicted image generating means in order to generate the predicted image; and (e) image updating means for performing a weighted summation of a first image which is one of the reproduced image and the reference image stored in the storing means, and at least a portion of a second image which is the other of the reproduced image and the reference image, to generate an updated image. In this configuration, (f) the image updating means stores the updated image into the storing means, and (g) the predicted image generating means uses the updated image stored in the storing means, as a reference image for generating a predicted image with respect to another target image.

The present invention associated with the aforementioned decoding of the moving picture faithfully restores the moving picture from the data generated based on the present invention associated with the aforementioned encoding of the moving picture.

In the present invention associated with the aforementioned encoding of the moving picture (the moving picture encoding apparatus, the moving picture method, and the moving picture encoding program), the image updating means may be configured as follows: it uses the reproduced image generated by the reproduced image generating means as the first image and uses the reference image stored in the storing means as the second image, and the image updating means performs a weighted summation of the reproduced image and at least a portion of the reference image to generate an updated reproduced image, and stores the updated reproduced image as the updated image into the storing means.

In this case, in the present invention associated with the aforementioned decoding of the moving picture (the moving picture decoding apparatus, the moving picture decoding method, and the moving picture decoding program) the image updating means uses the reproduced image generated by the reproduced image generating means as the first image, uses the reference image stored in the storing means as the second image, and stores an updated reproduced image generated by a weighted summation of the reproduced image and at least a portion of the reference image, as the updated image into the storing means.

In the present invention associated with the aforementioned encoding of the moving picture (the moving picture encoding apparatus, the moving picture encoding method, and the moving picture encoding program), the image updating means may be configured as follows: it uses the reference image stored in the storing means as the first image and uses the reproduced image generated by the reproduced image generating means as the second image, and the image updating means performs a weighted summation of the reference image and at least a portion of the reproduced image to generate an updated reference image, and stores the updated reference image as the updated image into the storing means.

In this case, in the present invention associated with the aforementioned decoding of the moving picture (the moving picture decoding apparatus, the moving picture decoding method, and the moving picture decoding program) the image updating means uses the reference image stored in the storing means as the first image, uses the reproduced image generated by the reproduced image generating means as the second image, and stores an updated reference image generated by a weighted summation of the reference image and at least a portion of the reproduced image, as the updated image into the storing means.

In the present invention associated with the aforementioned encoding of the moving picture (the moving picture encoding apparatus, the moving picture encoding method, and the moving picture encoding program), the image updating means may be configured as follows: it uses the reproduced image generated by the reproduced image generating means as the first image and uses the reference image stored in the storing means as the second image, and the image updating means performs a weighted summation of the reproduced image and at least a portion of the reference image to generate an updated reproduced image, and stores the updated reproduced image as the updated image into the storing means; the image updating means uses the reference image stored in the storing means as the first image and uses the reproduced image generated by the reproduced image generating means as the second image, and it performs a weighted summation of the reference image and at least a portion of the reproduced image to generate an updated reference image, and stores the updated reference image as the updated image into the storing means. In this case, the predicted image generating means can use at least one of the reproduced image, the updated reproduced image, the reference image (a reference image previously stored in the storing means), and the updated reference image, as a reference image for generating a predicted image with respect to another target image.

In this case, in the present invention associated with the aforementioned decoding of the moving picture (the moving picture decoding apparatus, the moving picture decoding method, and the moving picture decoding program), the image updating means uses the reproduced image generated by the reproduced image generating means as the first image, uses the reference image stored in the storing means as the second image, and stores an updated reproduced image generated by a weighted summation of the reproduced image and at least a portion of the reference image, as the updated image into the storing means; the image updating means uses the reference image stored in the storing means as the first image, uses the reproduced image generated by the reproduced image generating means as the second image, and stores an updated reference image generated by a weighted summation of the reference image and at least a portion of the reproduced image, into the storing means. The predicted image generating means can use at least one of the reproduced image, the updated reproduced image, the reference image, and the updated reference image, as a reference image for generating a predicted image with respect to another target image.

In the present invention associated with the aforementioned decoding of the moving picture (the moving picture decoding apparatus, the moving picture decoding method, and the moving picture decoding program), the encoded difference signal contains an update control signal to indicate at least one of a first state, a second state, a third state, and a fourth state; the image updating means generates the updated reproduced image when the update control signal indicates the first state; the image updating means generates the updated reference image when the update control signal indicates the second state; the image updating means generates the updated reproduced image and the updated reference image when the update control signal indicates the third state; and the image updating means generates neither the updated reproduced image nor the updated reference image when the update control signal indicates the fourth state.

Preferably, in the present invention associated with the aforementioned encoding of the moving picture (the moving picture encoding apparatus, the moving picture encoding method, and the moving picture encoding program), the image updating means obtains an amount of motion to specify a deviation of the second image relative to the first image, and performs a weighted summation of at least a portion of the second image at a corresponding position after movement based on the amount of motion, and the first image to generate the updated image.

In this case, in the present invention associated with the aforementioned decoding of the moving picture (the moving picture decoding apparatus, the moving picture decoding method, and the moving picture decoding program), the image updating means obtains a motion amount indicating a deviation of the second image relative to the first image, and performs a weighted summation of the first image and at least a portion of the second image at a corresponding position after movement based on the motion amount, to generate the updated image.

According to the present invention as described above, the averaging with motion compensation is effected without increase in the data volume associated with the motion amount, so that the reference image can be generated with less noise.

Incidentally, the present invention associated with the encoding of the moving picture (the moving picture encoding apparatus, the moving picture encoding method, and the moving picture encoding program) can also be configured as described below.

Another moving picture encoding apparatus according to the present invention is an apparatus comprising: (a) predicted image generating means for generating a predicted image, with respect to a target image as an object to be encoded among a plurality of images constituting a moving picture; (b) difference image generating means for executing a difference operation between the target image and the predicted image to generate a difference image; (c) encoding means for encoding the difference image to generate an encoded difference signal; (d) decoding means for decoding the encoded difference signal to generate a decoded difference image; (e) reproduced image generating means for executing a sum operation of the decoded difference image and the predicted image to generate a reproduced image; (f) storing means for storing a reference image to be used by the predicted image generating means in order to generate the predicted image; and (g) image updating means for defining the reference image stored in the storing means, as a first image and defining at least one of a reference image different from the first image, stored in the storing means, the reproduced image, and the decoded difference image, as a second image, and for performing a weighted summation of the first image and at least a portion of the second image to generate an updated image, wherein the image updating means stores the updated image into the storing means, and wherein the predicted image generating means uses the updated image stored in the storing means, as the reference image for generating the predicted image.

Another moving picture encoding method according to the present invention is a method comprising: (a) a predicted image generating step wherein predicted image generating means generates a predicted image, with respect to a target image as an object to be encoded among a plurality of images constituting a moving picture; (b) a difference image generating step wherein difference image generating means executes a difference operation between the target image and the predicted image to generate a difference image; (c) an encoding step wherein encoding means encodes the difference image to generate an encoded difference signal; (d) a decoding step wherein decoding means decodes the encoded difference signal to generate a decoded difference image; (e) a reproduced image generating step wherein reproduced image generating means executes a sum operation of the decoded difference image and the predicted image to generate a reproduced image; (f) a storing step wherein storing means stores a reference image to be used by the predicted image generating means in order to generate the predicted image; and (g) an image updating step wherein the image updating means defines the reference image stored in the storing means, as a first image and defines at least one of a reference image different from the first image, stored in the storing means, the reproduced image, and the decoded difference image, as a second image, and wherein the image updating means performs a weighted summation of the first image and at least a portion of the second image to generate an updated image, wherein in the image updating step the image updating means stores the updated image into the storing means, and wherein in the predicted image generating step the predicted image generating means uses the updated image stored in the storing means, as the reference image for generating the predicted image.

Another moving picture encoding program according to the present invention is a program for letting a computer function as: (a) predicted image generating means for generating a predicted image, with respect to a target image as an object to be encoded among a plurality of images constituting a moving picture; (b) difference image generating means for executing a difference operation between the target image and the predicted image to generate a difference image; (c) encoding means for encoding the difference image to generate an encoded difference signal; (d) decoding means for decoding the encoded difference signal to generate a decoded difference image; (e) reproduced image generating means for executing a sum operation of the decoded difference image and the predicted image to generate a reproduced image; (f) storing means for storing a reference image to be used by the predicted image generating means in order to generate the predicted image; and (g) image updating means for defining the reference image stored in the storing means, as a first image and defining at least one of a reference image different from the first image, stored in the storing means, the reproduced image, and the decoded difference image, as a second image, and for performing a weighted summation of the first image and at least a portion of the second image to generate an updated image, wherein the image updating means stores the updated image into the storing means, and wherein the predicted image generating means uses the updated image stored in the storing means, as the reference image for generating the predicted image.

The present invention associated with the decoding of the moving picture (the moving picture decoding apparatus, the moving picture decoding method, and the moving picture decoding program) can also be configured as follows.

Another moving picture decoding apparatus according to the present invention is an apparatus comprising: (a) decoding means for decoding an encoded difference signal resulting from predictive coding of a moving picture, to generate a decoded difference image; (b) predicted image generating means for generating a predicted image with respect to a target image as an object to be decoded, based on the encoded difference signal; (c) reproduced image generating means for performing a summation of the decoded difference image and the predicted image to generate a reproduced image; (d) storing means for storing a reference image to be used by the predicted image generating means in order to generate the predicted image; and (e) image updating means for defining the reference image stored in the storing means, as a first image and defining at least one of a reference image different from the first image, stored in the storing means, the reproduced image, and the decoded difference image, as a second image, and for performing a weighted summation of the first image and at least a portion of the second image to generate an updated image, wherein the image updating means stores the updated image into the storing means, and wherein the predicted image generating means uses the updated image stored in the storing means, as the reference image for generating the predicted image.

Another moving picture decoding method according to the present invention is a method comprising: (a) a decoding step wherein decoding means decodes an encoded difference signal resulting from predictive coding of a moving picture, to generate a decoded difference image; (b) a predicted image generating step wherein predicted image generating means generates a predicted image with respect to a target image as an object to be decoded, based on the encoded difference signal; (c) a reproduced image generating step wherein reproduced image generating means performs a summation of the decoded difference image and the predicted image to generate a reproduced image; (d) a storing step wherein storing means stores a reference image to be used by the predicted image generating means in order to generate the predicted image;

and (e) an image updating step wherein image updating means defines the reference image stored in the storing means, as a first image and defines at least one of a reference image different from the first image, stored in the storing means, the reproduced image, and the decoded difference image, as a second image, and performs a weighted summation of the first image and at least a portion of the second image to generate an updated image, wherein in the image updating step the image updating means stores the updated image into the storing means, and wherein in the predicted image generating step the predicted image generating means uses the updated image stored in the storing means, as the reference image for generating the predicted image.

Another moving picture decoding program according to the present invention is a program for letting a computer function as: (a) decoding means for decoding an encoded difference signal resulting from predictive coding of a moving picture, to generate a decoded difference image; (b) predicted image generating means for generating a predicted image with respect to a target image as an object to be decoded, based on the encoded difference signal; (c) reproduced image generating means for performing a summation of the decoded difference image and the predicted image to generate a reproduced image; (d) storing means for storing a reference image to be used by the predicted image generating means in order to generate the predicted image; and (e) image updating means for defining the reference image stored in the storing means, as a first image and defining at least one of a reference image different from the first image, stored in the storing means, the reproduced image, and the decoded difference image, as a second image, and for performing a weighted summation of the first image and at least a portion of the second image to generate an updated image, wherein the image updating means stores the updated image into the storing means, and wherein the predicted image generating means uses the updated image stored in the storing means, as the reference image for generating the predicted image.

As described above, the present invention provides the moving picture encoding apparatus, the moving picture encoding methods, and the moving picture encoding programs capable of reducing the noise in the reference image. Accordingly, the present invention reduces the data volume of the moving picture and increases the encoding efficiency. The present invention also utilizes the effect of noise reduction by the averaging, in the processing of different target images. Furthermore, the present invention permits the details of the image absent in one of the reproduced image and the reference image stored in the storing means, to be reflected in the reference image used in generation of the predicted image with respect to another target image, so as to further increase the encoding efficiency.

In addition, the present invention provides the moving picture decoding apparatus, the moving picture decoding methods, and the moving picture decoding programs capable of decoding the moving picture from the data generated based on the present invention associated with the encoding of the moving picture.

DESCRIPTION OF THE PREFERRED EMBODIMENTS

The preferred embodiments of the present invention will be described below in detail with reference to the drawings. Identical or equivalent portions will be denoted by the same reference symbols in each of the drawings.

Figure 1:
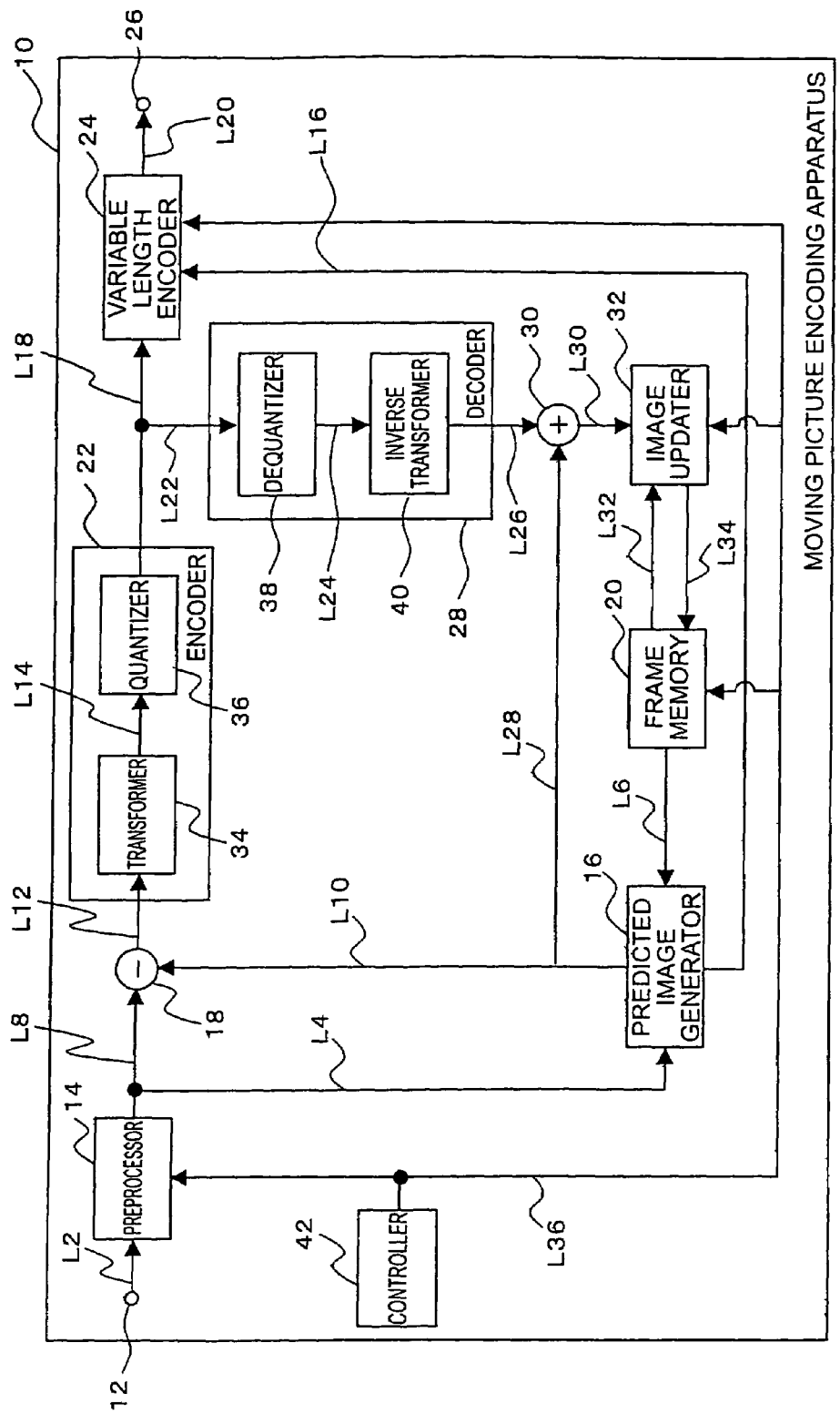
FIG. 1 is an illustration showing a configuration of a moving picture encoding apparatus according to an embodiment of the present invention.

FIG. 1 is an illustration showing a configuration of a moving picture encoding apparatus according to an embodiment of the present invention. The moving picture encoding apparatus 10 shown in FIG. 1 can be physically composed of a computer comprising a CPU (central processing unit), a storage device such as a memory, a display unit, a communication device, and so on. The moving picture encoding apparatus 10 may be a mobile telecommunications terminal such as a cell phone. Namely, a variety of information processing equipment can be applied to the moving picture encoding apparatus 10.

As shown in FIG. 1, the moving picture encoding apparatus 10 is functionally composed of an input terminal 12, a preprocessor 14, a predicted image generator (predicted image generating means) 16, a difference image generator (difference image generating means) 18, a frame memory (storing means) 20, an encoder (encoding means) 22, a variable length encoder 24, an output terminal 26, a decoder (decoding means) 28, a reproduced image generator (reproduced image generating means) 30, and an image updater (image updating means) 32.

A moving picture consisting of a plurality of images is fed to the input terminal 12. The moving picture is then fed from the input terminal 12 to the preprocessor 14.

The preprocessor 14 receives the moving picture fed via line L2 and subjects a target image to a preprocessing, while the target image is sequentially selected as an object to be encoded from the plurality of input images constituting the moving picture. The preprocessor 14 is able to filter the target image in order to reduce noise, as the preprocessing. This noise is generated in the image, for example, during photography with a camera. The preprocessor 14 is able to convert the target image into a predetermined size according to need, as the preprocessing. Furthermore, the preprocessor 14 divides the target image into a plurality of blocks of a predetermined size, and outputs each block, as the preprocessing. An example of this predetermined size is the size of 16×16 pixels. In the moving picture encoding apparatus 10, each of the blocks outputted from the preprocessor 14 is subjected to processes as described below.

The predicted image generator 16 generates a predicted image with respect to a target image. Specifically, the predicted image generator 16 defines a block fed via line L4 from the preprocessor 14, as a target block being an object to be processed, and generates a predicted image with respect to an image of this target block.

The predicted image generator 16 acquires a reference image stored in the frame memory 20, via line L6. The frame memory 20 stores a reproduced image with respect to an input image previously defined as a target to be encoded prior to a target image of interest, as a reference image for generation of the predicted image by the predicted image generator 16. The reproduced image will be detailed later. The predicted image generator 16 uses this reference image to generate the predicted image with respect to the target block by motion-compensated prediction. Namely, the predicted image generator 16 obtains a motion amount (motion vector) of the target block relative to the reference image. This motion vector can be obtained, for example, by block matching and can be a vector from the target block to a region in the reference image with the highest correlation. The predicted image generator 16 outputs the obtained motion vector and the predicted image. This predicted image is an image in the region in the reference image specified by the motion vector.

The difference image generator 18 executes a difference operation between a target image and a predicted image to generate a difference image. Specifically, the difference image generator 18 obtains a difference between an image of a target block fed via line L8 from the preprocessor 14 and a predicted image of the target block fed via line L10 from the predicted image generator 16, to generate a difference image.

The encoder 22 encodes the difference image to generate an encoded difference signal. In the present embodiment the encoder 22 has a transformer 34 and a quantizer 36. The transformer 34 transforms a difference image of a target block fed via line L12 from the difference image generator 18. The transformer 34 transforms the difference image into a signal in a frequency domain, for example, by DCT (Discrete Cosine Transform). The quantizer 36 quantizes the signal fed via line L14 from the transformer 34. The signal quantized by the quantizer 36 is the encoded difference signal.

The variable length encoder 24 performs variable length coding of a motion vector fed via line L16 from the predicted image generator 16 and an encoded difference signal fed via line L18 from the encoder 22 to generate encoded data. The variable length encoder 24 can use the arithmetic coding, for example. The variable length encoder 24 outputs a bit stream including the encoded data, via line L20 to the output terminal 26.

The decoder 28 decodes an encoded difference signal to generate a decoded difference image. The decoding herein is a process symmetric with the encoding in the encoder 22. Specifically, the decoder 28 has a dequantizer 38 and an inverse transformer 40.

The dequantizer 38 receives an encoded difference signal fed via line L22 from the encoder 22. The dequantizer 38 applies dequantization, which is a process symmetric with the quantization by the quantizer 36, to the encoded difference signal.

The inverse transformer 40 receives a signal from the dequantizer 38 (signal resulting from the dequantization) via line L24 and applies an inverse transformation to the signal to generate a decoded difference image of a target block. The inverse transformation by the inverse transformer 40 is a process symmetric with the transformation by the transformer 34, and, where the transformer 34 uses DCT, the inverse transformer 40 uses IDCT (Inverse Discrete Cosine Transform).

The reproduced image generator 30 performs a summation of a decoded difference image and a predicted image to generate a reproduced image. Specifically, the reproduced image generator 30 performs a summation of a decoded difference image fed via line L26 from the decoder 28 and a predicted image fed via line L28 from the predicted image generator 16, to generate a reproduced image of a target block.

The image updater 32 receives a reproduced image from the reproduced image generator 30 via line L30 and receives a reference image stored in the frame memory 20, via line L32. The image updater 32 defines one of the reproduced image and the reference image as a first image, and the other of the reproduced image and the reference image as a second image, and performs a weighted summation of the first image and the second image to generate an updated image. This updated image is stored into the frame memory 20 to be used for encoding of a different target image. Namely, the updated image is stored in the frame memory 20 and is used as a reference image for generation of a predicted image with respect to an input image as an object to be encoded after the target image, by the predicted image generator 16. This weighted summation is to apply weights at an arbitrary ratio to the first image and the second image to keep weighted pixel values within a desired level.

Figure 2:
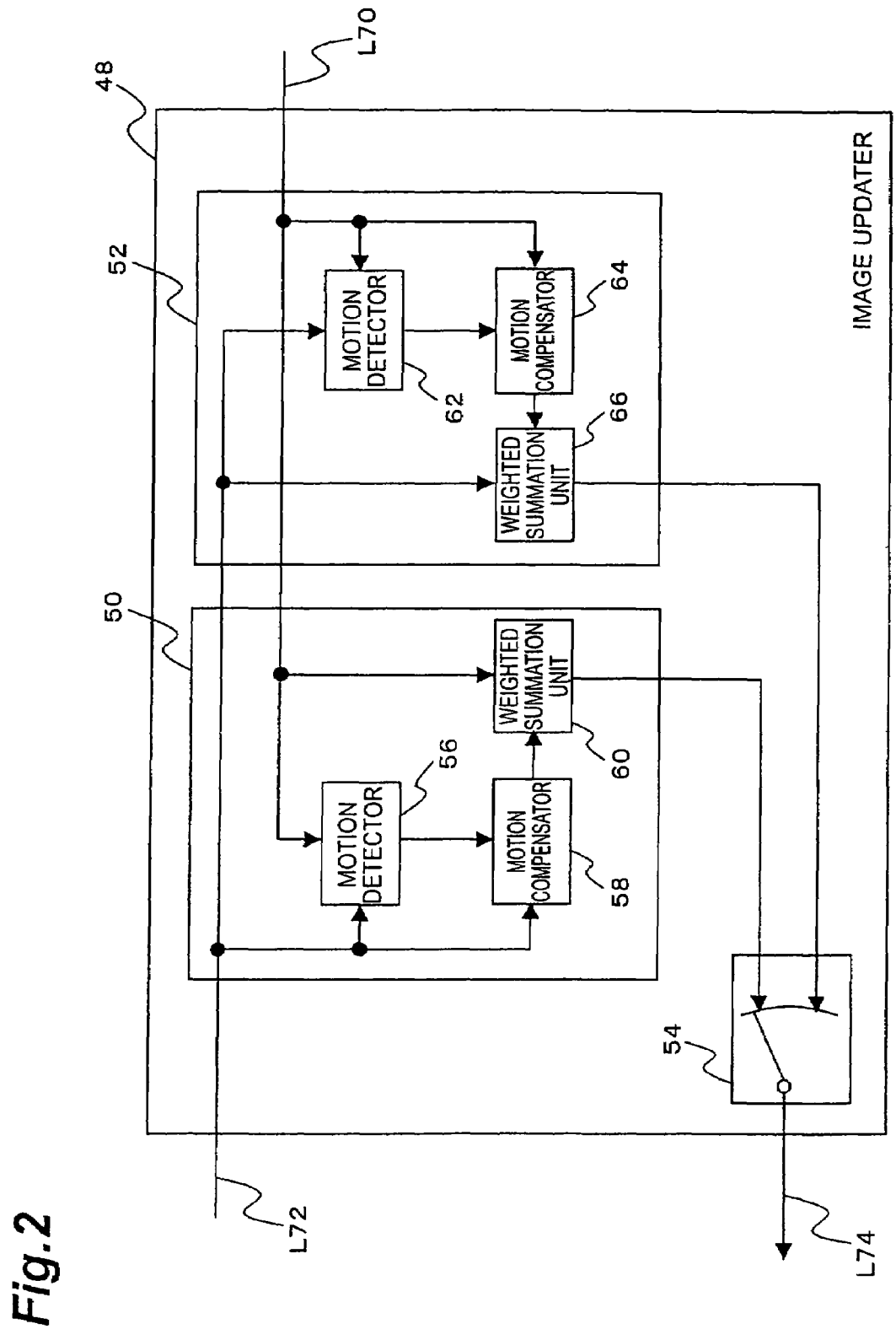
FIG. 2 is an illustration showing a configuration of an embodiment of an image updater.

The image updater 32 will be described below with reference FIG. 2. FIG. 2 is an illustration showing a configuration of an embodiment of the image updater. The moving picture encoding apparatus 10 can use the image updater 48 shown in FIG. 2, as the image updater 32. The image updater 48 has an updated reproduced image generator 50, an updated reference image generator 52, and a switch 54.

The updated reproduced image generator 50 generates as an updated image an updated reproduced image resulting from a weighted summation of a reproduced image and a reference image. Namely, the updated reproduced image generator 50 uses a reproduced image as a first image and a reference image as a second image.

The updated reproduced image generator 50 has a motion detector 56, a motion compensator 58, and a weighted summation unit 60. The motion detector 56 receives a reproduced image via line L70 and a reference image via line L72. In the case of the moving picture encoding apparatus 10, line L70 corresponds to line L30, and line L72 corresponds to line L32.

The motion detector 56 acquires a motion amount (motion vector) relative to the reference image, for each of blocks in the reproduced image. The size of each block can be, for example, the size of 4×4 pixels. The motion compensator 58 outputs an image in a region in the reference image specified by the motion vector obtained by the motion detector 56. The weighted summation unit 60 performs a weighted summation with arbitrary weights of the image from the motion compensator 58 and the reproduced image of the block to generate an updated reproduced image at the corresponding position in the block. This weighted summation is to apply weights at a certain ratio, e.g., 1:1, or 2:1 to the reproduced image and the reference image to keep pixel values after the summation within a desired range.

The updated reproduced image generated in this manner by the updated reproduced image generator 50 is fed via switch 54 and line L74 back to the frame memory and is utilized in subsequent encoding, as a reference image with respect to a different target image. In the case of the moving picture encoding apparatus 10, line L74 corresponds to line L34.

The updated reference image generator 52 performs a weighted summation of a reference image and a reproduced image to generate an updated reference image as an updated image. Namely, the updated reference image generator 52 uses the reference image as a first image and uses the reproduced image as a second image.

The updated reference image generator 52 has a motion detector 62, a motion compensator 64, and a weighted summation unit 66. The motion detector 62 receives a reproduced image via line L70 and a reference image via line L72.

The motion detector 62 obtains a motion amount (motion vector) relative to the reproduced image, for each of blocks in the reference image. The size of each block can also be, for example, the size of 4×4 pixels. The motion detector 62 may use a vector having a direction opposite to the direction of the motion vector generated by the motion detector 56.

The motion compensator 64 outputs an image in a region in the reproduced image specified by the motion vector from the motion detector 62. The weighted summation unit 66 performs a weighted summation with arbitrary weights of the image from the motion compensator 64 and the reference image of the block to generate an updated reference image at the corresponding position in the block. This weighted summation is to apply weights at a certain ratio, e.g., 1:1, or 2:1 to the reference image and the reproduced image to keep pixel values after the summation within a desired range.

The updated reference image generated in this manner by the updated reference image generator 52 is fed via switch 54 and line L74 back to the frame memory and is used in subsequent encoding, as a reference image with respect to a different target image.

Each of the updated reproduced image generator 50 and the updated reference image generator 52 may be constructed without the associated motion detector 56 or 62. In this case, each of the motion compensator 58 and the motion compensator 64 can use the motion vector obtained by the predicted image generator 16.

The motion detector 56 and the motion detector 62 may be configured to use the motion vector obtained by the predicted image generator 16, as an offset to obtain a finer motion vector.

The motion vectors obtained by the motion detector 56 and by the motion detector 62 may be transmitted or may not be transmitted to the decoding side by the variable length encoder 24. In the latter case, the decoding side executes processing similar to that by the motion detector 56 and the motion detector 62.

In the frame memory 20, a reproduced image is stored in addition to an updated reproduced image and an updated reference image, and a reference image stored in the frame memory 20 may further be stored as it is. In this case, the reproduced image, the updated reproduced image, the updated reference image, and the reference image are used as reference images in encoding of a different target image.

Figure 3:
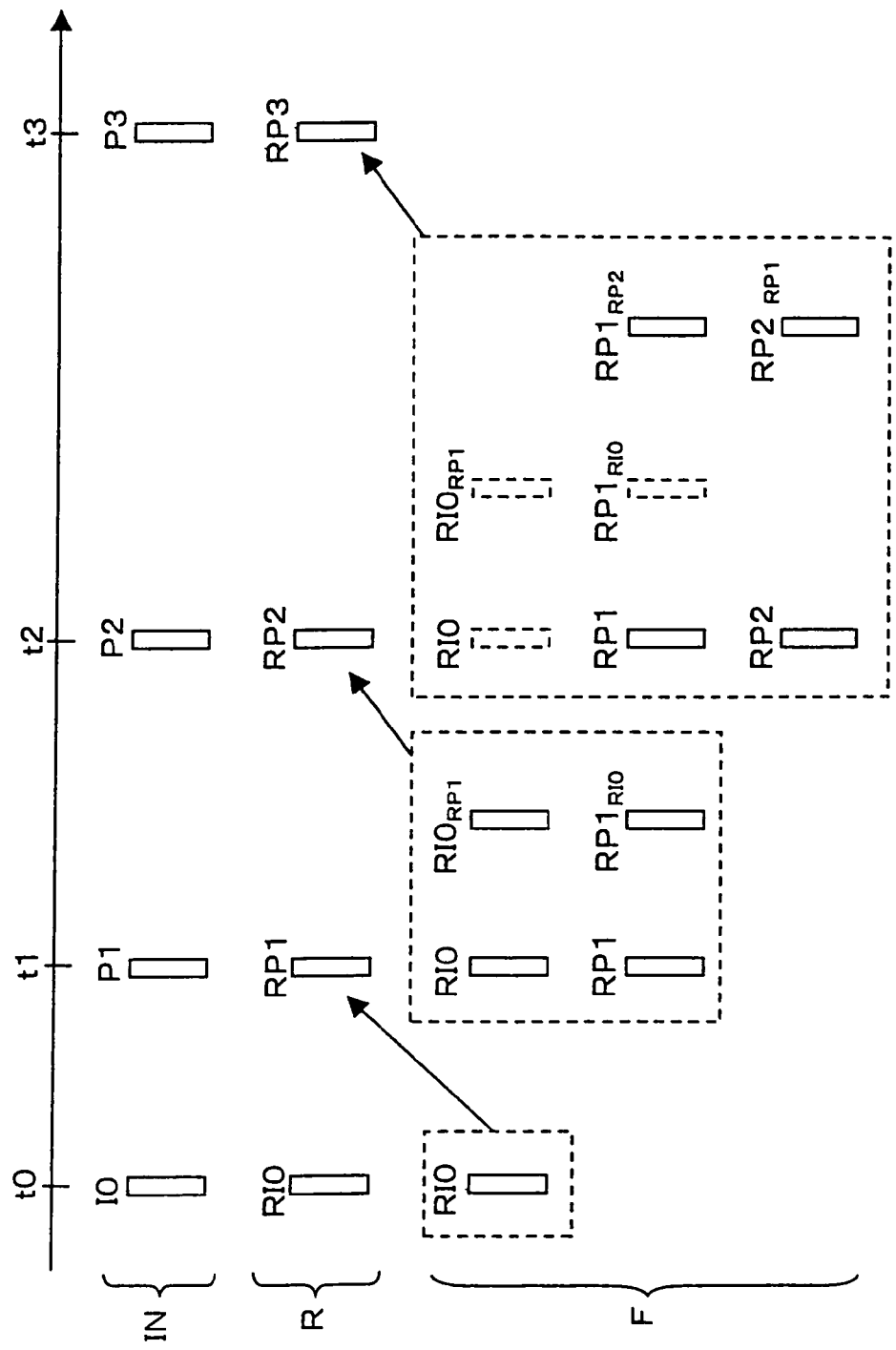
FIG. 3 is an illustration for explaining a concept of an image update in a case using forward prediction.
Figure 4:
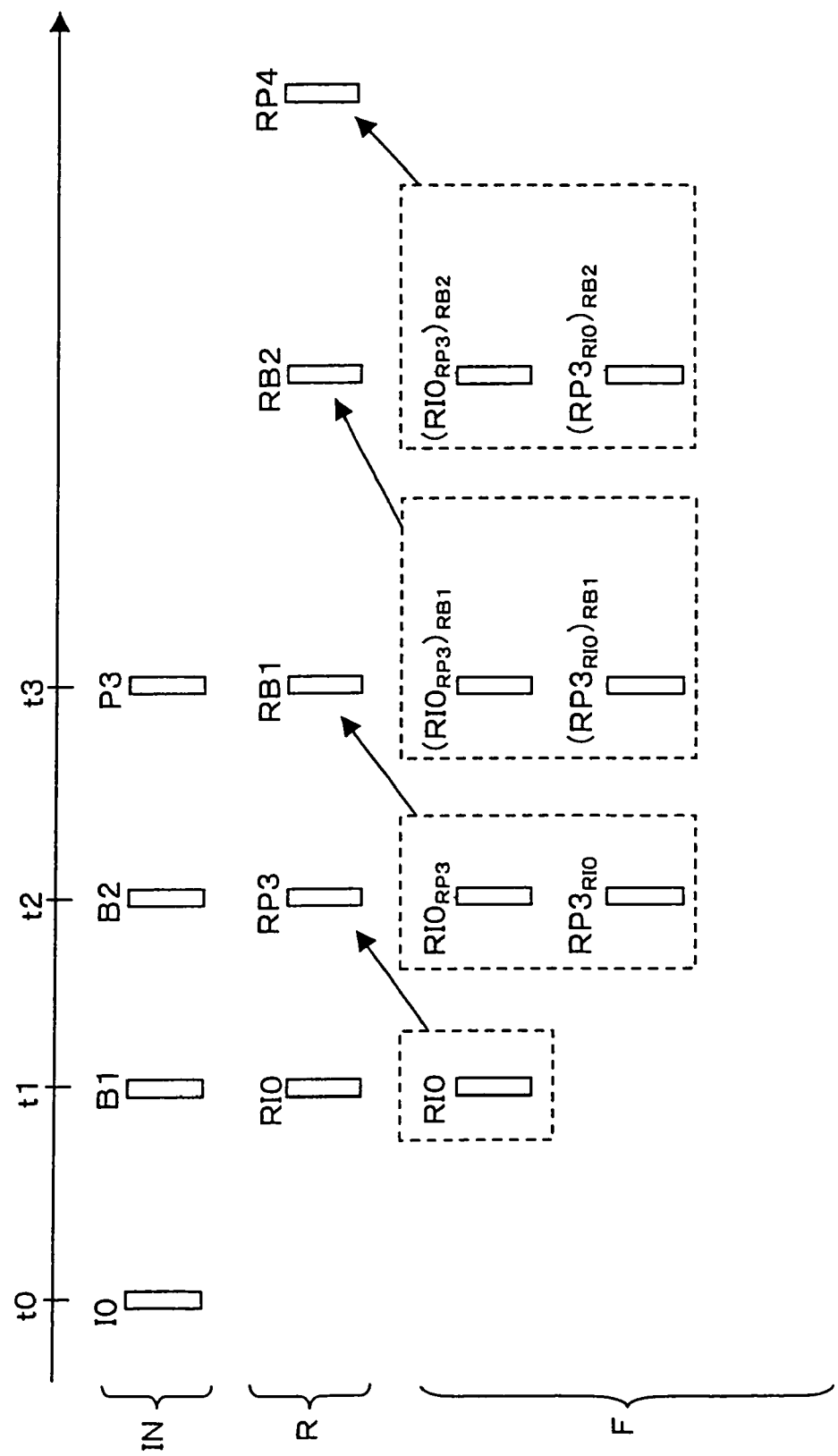
FIG. 4 is an illustration for explaining a concept of an image update in a case using bidirectional prediction.

Time series of reference images stored in the frame memory will be described below with reference to FIGS. 3 and 4. FIG. 3 is an illustration for explaining a concept of image update in a case where the forward prediction is carried out. FIG. 4 is an illustration for explaining a concept of image update in a case where the bidirectional prediction is carried out. In FIGS. 3 and 4, input images are shown in the region with reference symbol IN, reproduced images in the region with reference symbol R, and images stored in the frame memory in the region with reference symbol F.

Since the forward prediction involves no backward prediction, we can assume that there is no algorithm-based delay.

In the case of the forward prediction, as shown in FIG. 3, input images I0, P1, P2, P3 . . . are fed in order at times t0, t1, t2, t3 . . . At time t0, the input image I0 is a target image, a reproduced image RI0 is generated, for example, through the intraframe coding and decoding, and the reproduced image RI0 is stored as a reference image in the frame memory 20.

At time t1, the input image P1 is a target image, and a reproduced image RP1 is generated using the reference image RI0 stored in the frame memory 20. At time t1, the reference image RI0, the reproduced image RP1, and, an updated reference image $RI0_{RP1}$ and an updated reproduced image $RP1_{RI0}$ generated from the reproduced image RP1 and the reference image RI0 are stored as reference images in the frame memory 20.

At time t2, the input image P2 is a target image, and a reproduced image RP2 is generated using the reference images RI0, RP1, $RI0_{RP1}$ and $RP1_{RI0}$ stored at time t1 in the frame memory 20. At time t2, the reproduced image RP1, the reproduced image RP2, and, an updated reference image $RP1_{RP2}$ and an updated reproduced image $RP2_{RP1}$ generated using the reference image RP1 and the reproduced image RP2 are stored as reference images in the frame memory 20. At time t2, the reference images RI0, $RI0_{RP1}$, and $RP1_{RI0}$ are deleted from the frame memory 20. However, without deleting them, they may also be used in generation of a reproduced image at time t3.

At time t3, the input image P3 is a target image, and a reproduced image RP3 is generated using the reference images stored at time t2 in the frame memory 20.

In the case of the bidirectional prediction, an algorithm-based delay occurs in input and reproduction of images. In the case of the bidirectional prediction, as shown in FIG. 4, input images I0, B1, B2, P3 . . . are fed in order.

At time t0, the input image I0 is a target image and a reproduced image RI0 is generated, for example, through the intraframe coding and decoding. The reproduced image RI0 is stored as a reference image in the frame memory 20. The reproduced image RI0 is reproduced at time t1 in the case of the bidirectional prediction.

Since the input image B1 and the input image B2 are encoded from the input images I0 and P3, the input image P3 is a target image at time t1, and a reproduced image RP3 of the target image P3 is generated using the reference image RI0 at time t2. At time t2, an updated reference image $RI0_{RP3}$ and an updated reference image $RP3_{RI0}$ are generated using the reproduced image RP3 and the reference image RI0, and are stored as reference images in the frame memory 20.

At time t2, the input image B1 and the input image B2 are target images, and each of them is encoded. At time t3, a reproduced image RB1 of the target image B1 is generated using the reference images $RI0_{RP3}$ and $RP3_{RI0}$. At the same time, an updated reference image $(RI0_{RP3})_{RB1}$ is generated using the reproduced image RB1 and the reference image $RI0_{RP3}$, and an updated reference image $(RP3_{RI0})_{RB1}$ is generated using the reproduced image RB1 and the reference image $RP3_{RI0}$. These images generated are stored as reference images in the frame memory 20. The reference images $(RI0_{RP3})_{RB1}$ and $(RP3_{RI0})_{RB1}$ are used in encoding and decoding of the target image B2.

Figure 5:
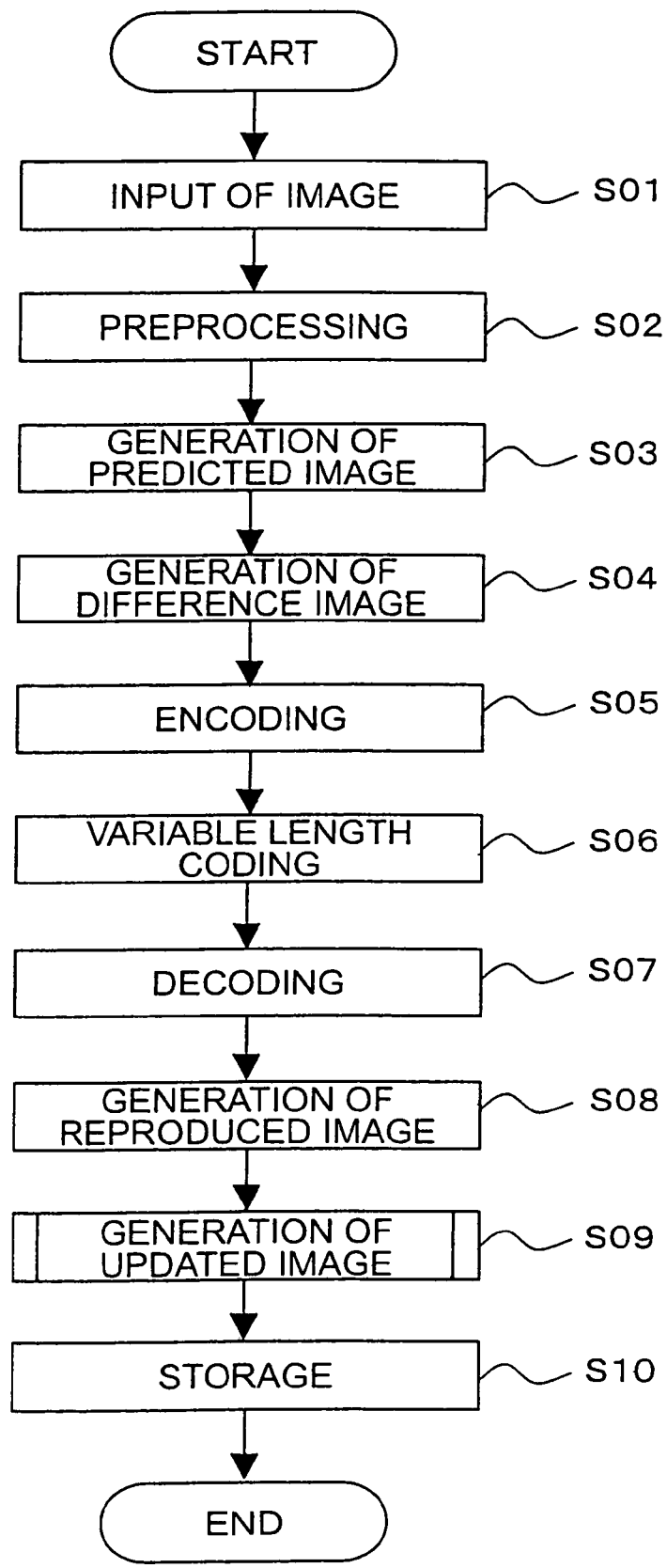
FIG. 5 is a flowchart showing a moving picture encoding method according to an embodiment of the present invention.

The operation of the moving picture encoding apparatus 10 according to the present embodiment will be described below. In addition, a moving picture encoding method according to an embodiment of the present invention will be described. FIG. 5 is a flowchart of the moving picture encoding method according to the embodiment of the present invention.

In this moving picture encoding method, as shown in FIG. 5, the first step is to sequentially feed a plurality of images forming a moving picture, each as a target image being an object to be encoded (step S01). Then the preprocessor 14 performs the aforementioned preprocessing (step S02).

Next, the predicted image generator 16 generates a predicted image with respect to a target image (step S03). The difference operation between the predicted image and the target image is executed to generate a difference image (step S04).

Then the encoder 22 executes the encoding operation to generate an encoded difference signal from the difference image (step S05). Then the variable length encoder 24 performs the variable length coding of the encoded difference signal and motion vector to generate a bit stream (step S06).

Next, the decoder 28 executes the decoding operation to generate a decoded difference image from the encoded difference signal (step S07). The reproduced image generator 30 adds the decoded difference image to the predicted image, so as to generate a reproduced image (step S08). Then the image updater 32 generates an updated image (step S09) and the updated image is stored into the frame memory 20 (step S10).

Figure 6:
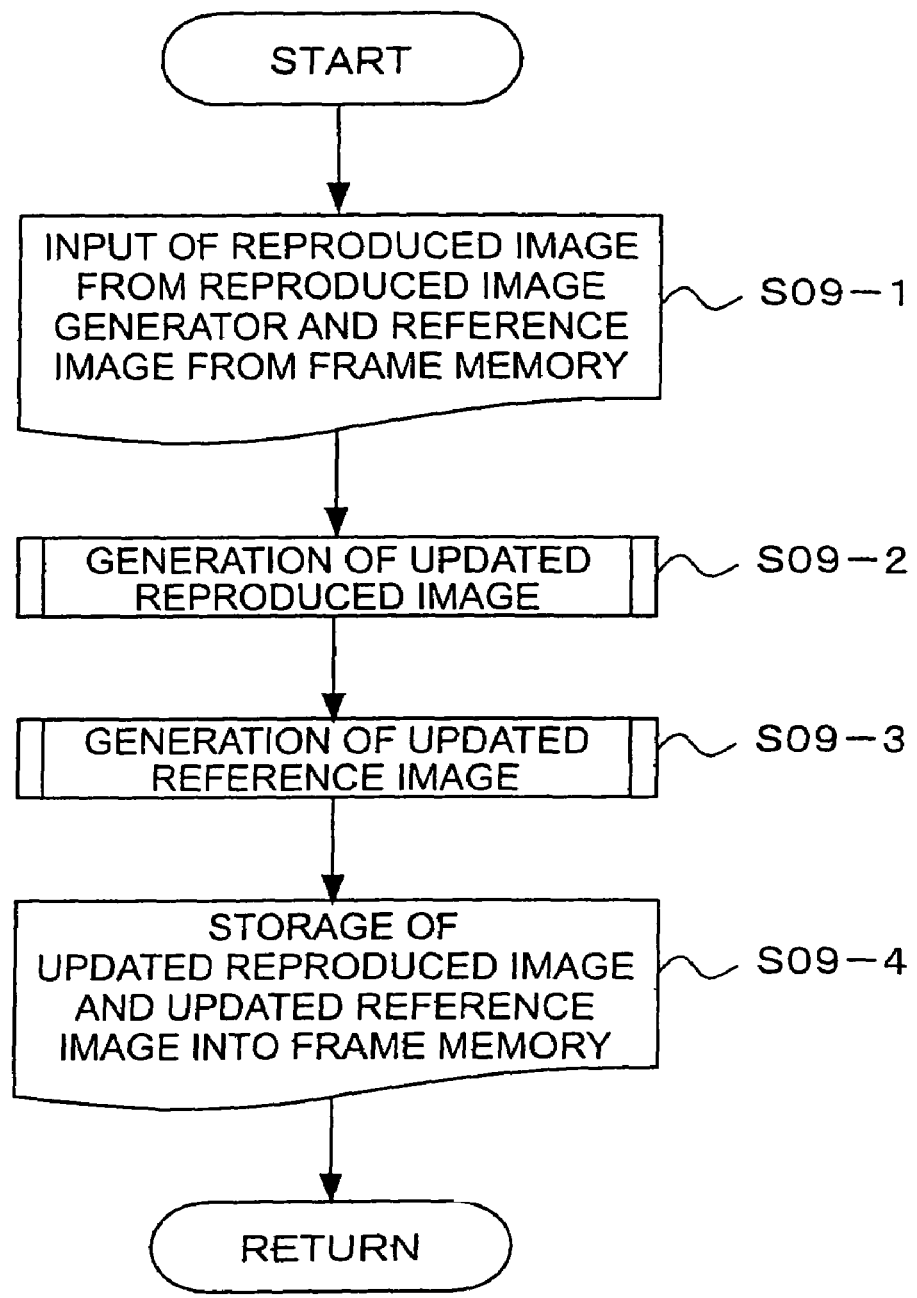
FIG. 6 is a flowchart about generation of an updated image.

The generation of the updated image at step S09 will be described below in detail. FIG. 6 is a flowchart about the generation of the updated image. In the process of generating the updated image, a reproduced image from the reproduced image generator 30 and a reference image from the frame memory 20 are fed to the image updater 32 (step S09-1).

Then the updated reproduced image generator 50 updates the reproduced image by use of the reference image to generate an updated reproduced image (step S09-2). In addition, the updated reference image generator 52 updates the reference image by use of the reproduced image to generate an updated reference image (step S09-3). The updated reproduced image and the updated reference image are stored as updated images in the frame memory 20 (step S09-4).

Figure 7:
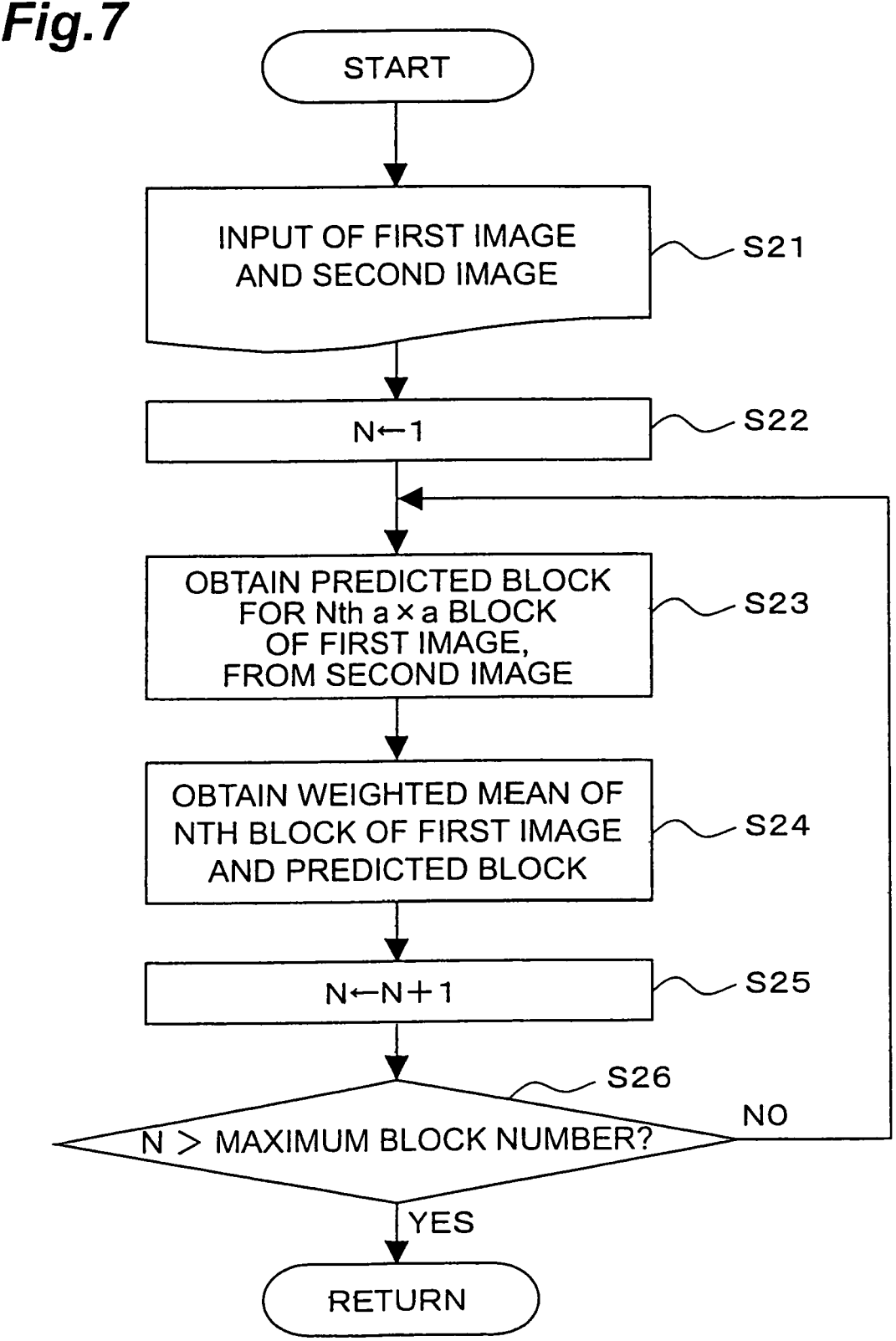
FIG. 7 is a flowchart about details of the generation of the updated image.

The generation of the updated reproduced image and the updated reference image will be described below in detail. FIG. 7 is a flowchart about details of generation of an updated image. The following will describe the generation of the updated reproduced image and the updated reference image, using one of the reproduced image and the reference image as a first image and using the other of the reproduced image and the reference image as a second image. It will be understood from the following description that an updated reproduced image is generated as an updated image, using the reproduced image as the first image and using the reference image as the second image and that an updated reference image is generated as an updated image, using the reference image as the first image and using the reproduced image as the second image.

As shown in FIG. 7, the first image and the second image are first fed (step S21). Then variable N is set to 1 (step S22). This variable N counts the number of blocks resulting from division of the first image. The size of each block is a×a, e.g., can be 4×4.

Next, a predicted block for the Nth block of the first image is obtained from the second image (step S23). Then a weighted mean of the Nth block of the first image and the predicted block is obtained to generate an updated image of the Nth block (step S24).

Next, N is incremented by "1" (step S25), and then a test is conducted to determine whether the incremented N exceeds the maximum block number (step S26). When the result of this test is No, the processes from step S23 are repeated; when the result of the test is Yes, the processing is terminated.

Figure 8:
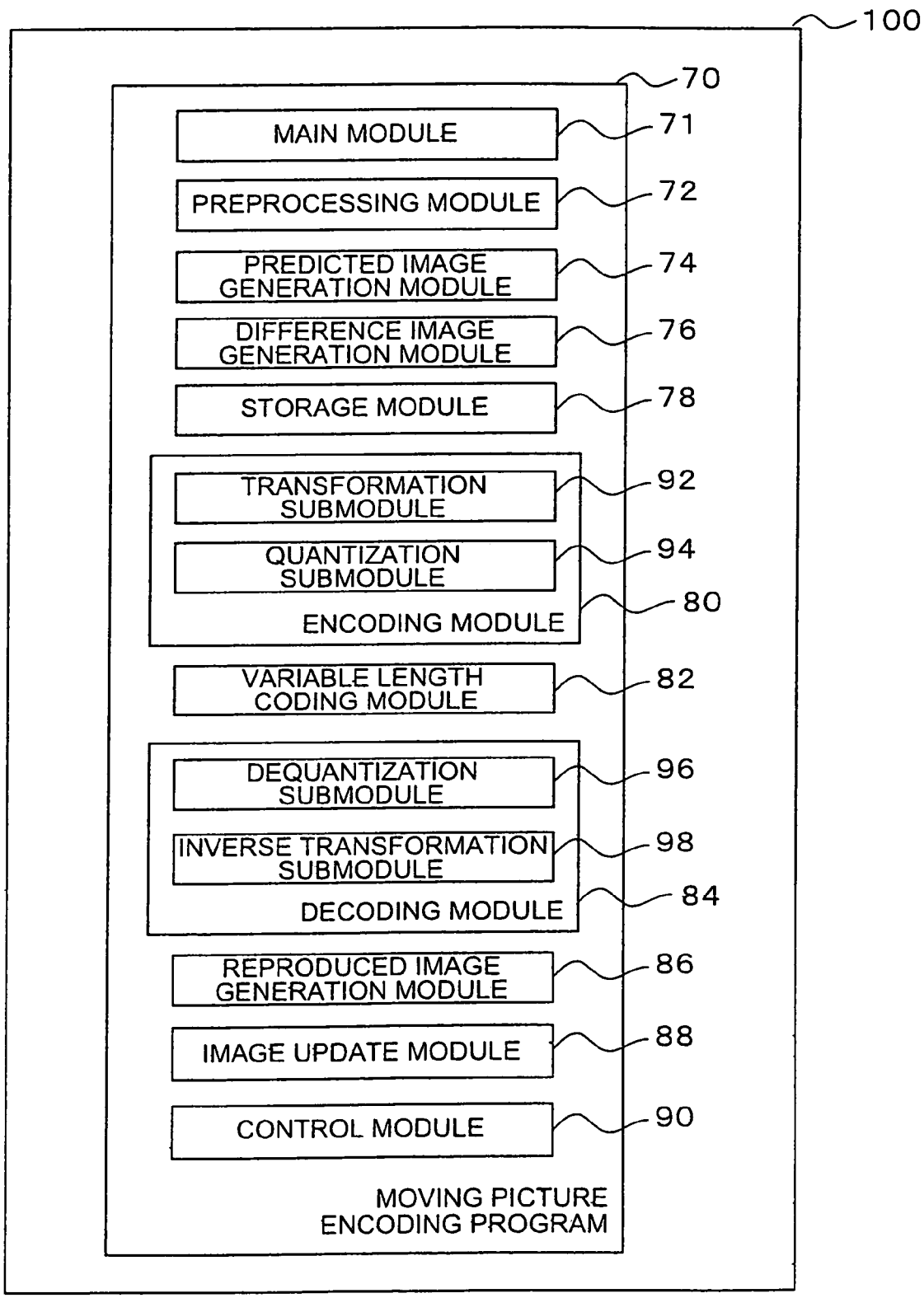
FIG. 8 is an illustration showing a configuration of a moving picture encoding program according to an embodiment of the present invention, together with a recording medium.

A moving picture encoding program for letting a computer act as the moving picture encoding apparatus 10 will be described below. FIG. 8 is an illustration showing a configuration of the moving picture encoding program according to an embodiment of the present invention, together with a recording medium.

As shown in FIG. 8, the moving picture encoding program 70 is provided as stored in a recording medium 100. Examples of the recording medium 100 include such recording media as a flexible disk, CD-ROM, DVD, or ROM, semiconductor memories, and so on.

Figure 9:
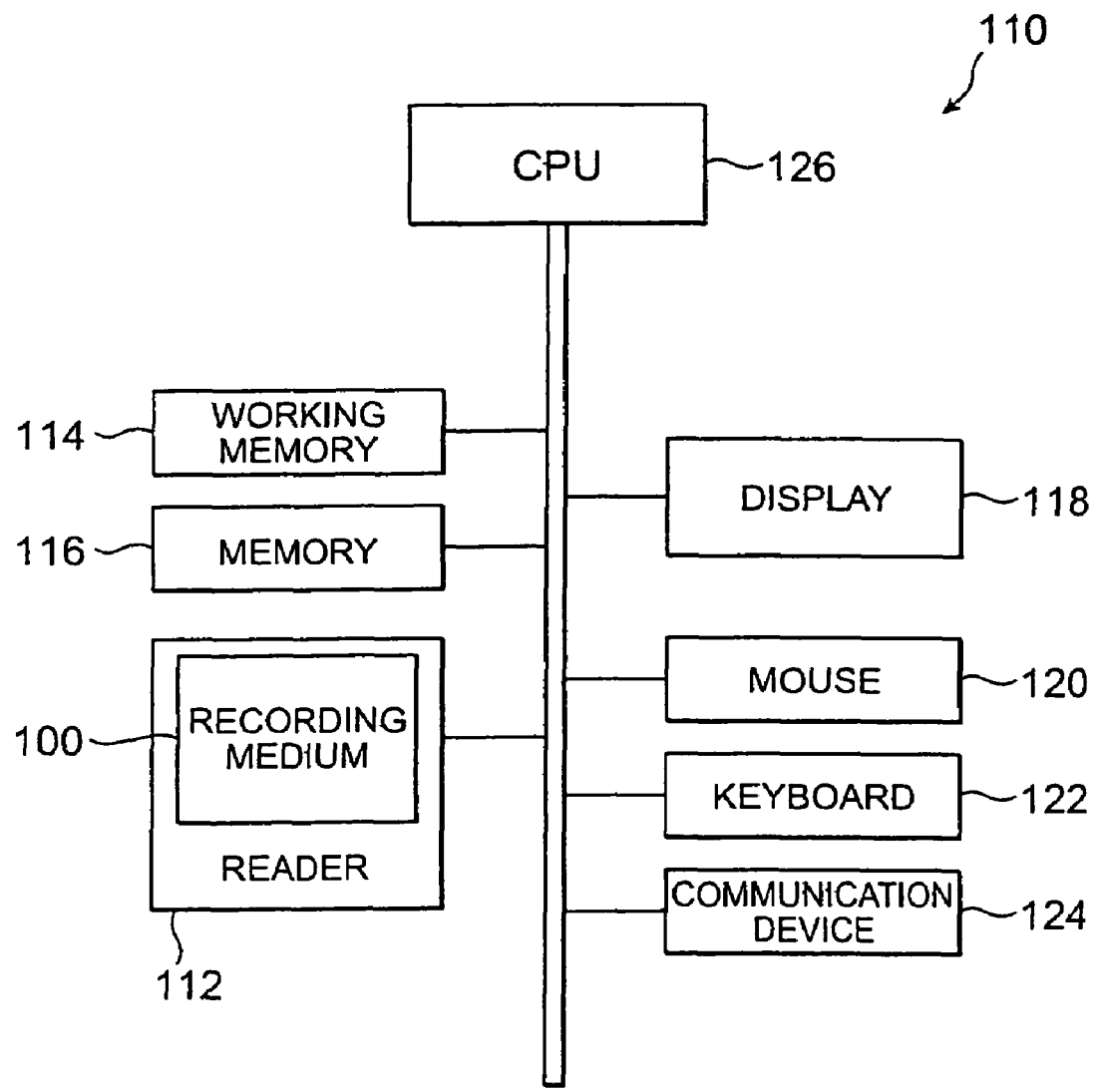
FIG. 9 is an illustration showing a hardware configuration of a computer for executing a program stored in a recording medium.
Figure 10:
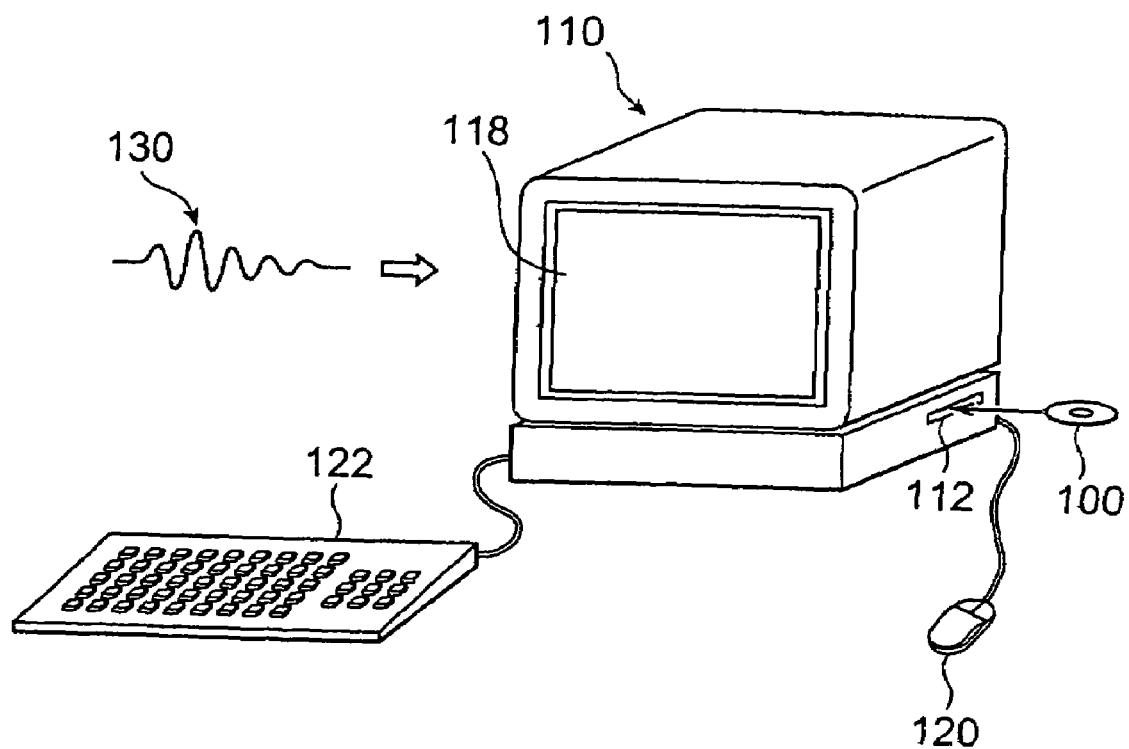
FIG. 10 is a perspective view of a computer for executing a program stored in a recording medium.

FIG. 9 is an illustration showing a hardware configuration of a computer for executing the program stored in the recording medium, and FIG. 10 is a perspective view of the computer for executing the program stored in the recording medium. As shown in FIG. 9, the computer 110 is comprised of a reading device 112 such as a flexible disk drive, a CD-ROM drive, or a DVD drive, a working memory (RAM) 114 in which an operating system is resident, a memory 116 storing the program stored in the recording medium 100, a display unit 118, a mouse 120 and keyboard 122 as input units, a communication device 124 for carrying out transmission and reception of data and others, and a CPU 126 for controlling execution of the program. When the recording medium 100 is inserted into the reading device 112 of the computer 110, the reading device 112 becomes accessible to the moving picture encoding program 70 stored in the recording medium 100, and the computer 110 becomes ready to act as the moving picture encoding apparatus 10 on the basis of the moving picture encoding program 70.

As shown in FIG. 10, the moving picture encoding program 70 may be a program provided in the form of a computer data signal 130 superimposed on a carrier wave, through a network. In this case, the computer 110 stores the moving picture encoding program 70 received by the communication device 124, into the memory 116, whereby the computer 110 can execute the moving picture encoding program 70.

As shown in FIG. 8, the moving picture encoding program 70 is comprised of a main module 71 controlling the processing, a preprocessing module 72, a predicted image generation module 74, a difference image generation module 76, a storage module 78, an encoding module 80, a variable length coding module 82, a decoding module 84, a reproduced image generation module 86, and an image update module 88. The encoding module 80 is comprised of a transformation submodule 92 and a quantization submodule 94, and the decoding module 84 is comprised of a dequantization submodule 96 and an inverse transformation submodule 98.

The functions implemented by the computer on the basis of the preprocessing module 72, predicted image generation module 74, difference image generation module 76, storage module 78, encoding module 80, variable length coding module 82, decoding module 84, reproduced image generation module 86, image update module 88, transformation submodule 92, quantization submodule 94, dequantization submodule 96, and inverse transformation submodule 98 are similar to those of the associated elements of the aforementioned preprocessor 14, predicted image generator 16, difference image generator 18, frame memory 20, encoder 22, variable length encoder 24, decoder 28, reproduced image generator 30, image updater 32, transformer 34, quantizer 36, dequantizer 38, and inverse transformer 40, respectively.

The above described the moving picture encoding apparatus 10 of the present invention, but the apparatus can also be configured to execute the processing by the image updater 32 only in a case effective to improvement in the encoding efficiency. In this case, as shown in FIG. 1, the moving picture encoding apparatus 10 can further comprise a controller 42.

The controller 42 conducts a test to determine whether there is a scene change in a moving picture. Whether there is a scene change in a moving picture can be determined, for example, by a level of correlation between different input images. When there is a scene change, the controller 42 outputs an update control signal to indicate no updated image generation, via line L36 to the image updater 32. When a scene change is small on the other hand, the controller 42 outputs an update control signal to indicate generation of an update image, to the image updater 32.

The update control signal can take any one of a first state, a second state, a third state, and a fourth state. The image updater 32 generates the updated reproduced image when the update control signal is the first state; the image updater 32 generates the updated reference image when the update control signal is the second state; the image updater 32 generates the updated reproduced image and the updated reference image when the update control signal is the third state; the image updater 32 generates neither the updated reproduced image nor the updated reference image when the update control signal is the fourth state.

The controller 42 also outputs the update control signal to the variable length encoder 24. The variable length encoder 24 puts the update control signal into the head part of each image in a moving picture, and transmit it. The update control signal is included in the header part in the form of a signal of a minimum bit count necessary for indicating the above states. For example, where the update control signal is permitted to take the third state and the fourth state, the update control signal can be a 1-bit signal which represents the third state by "1" and the fourth state by "0".

In a case where the computer 110 further implements the function corresponding to the controller 42, the moving picture encoding program 70 can be configured to further comprise a control module 90 to make the computer 110 implement the function corresponding to the controller 42, as shown in FIG. 8.

Figure 11:
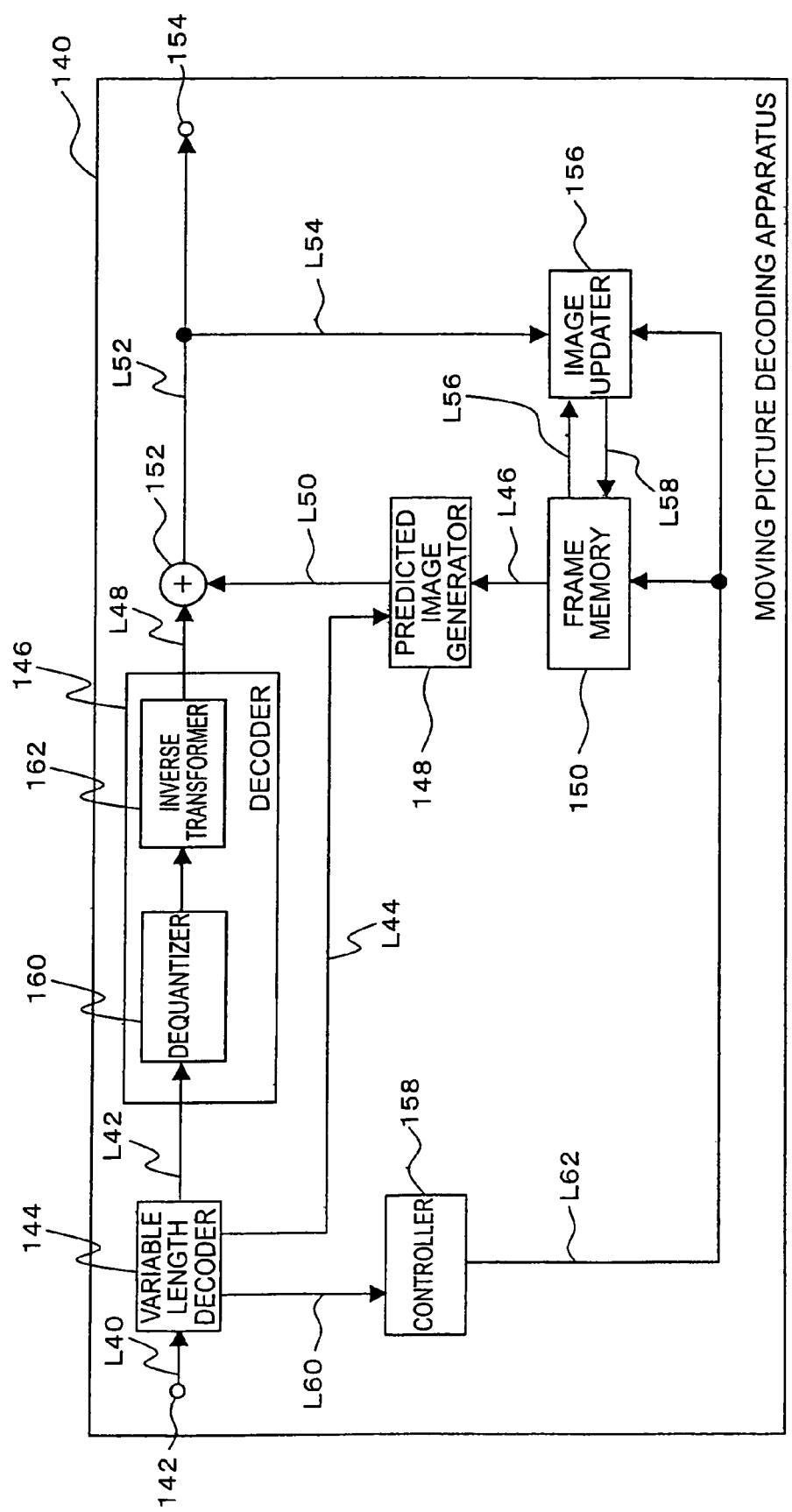
FIG. 11 is an illustration showing a configuration of a moving picture decoding apparatus according to an embodiment of the present invention.

Next, a moving picture decoding apparatus according to an embodiment of the present invention will be described. FIG. 11 is an illustration showing a configuration of the moving picture decoding apparatus according to the embodiment of the present invention. The moving picture decoding apparatus 140 shown in FIG. 11 is an apparatus capable of reproducing a moving picture from a bit stream generated by the moving picture encoding apparatus 10.

The moving picture decoding apparatus 140 can be physically composed of a computer consisting of a CPU (central processing unit), a storage device such as a memory, a display device, a communication device, and so on. The moving picture decoding apparatus 140 may be a mobile telecommunications terminal such as a cell phone. Namely, a variety of information processing equipment can be applied to the moving picture decoding apparatus 140.

As shown in FIG. 11, the moving picture decoding apparatus 140 is functionally composed of an input terminal 142, a variable length decoder 144, a decoder (decoding means) 146, a predicted image generator (predicted image generating means) 148, a frame memory (storing means) 150, a reproduced image generator (reproduced image generating means) 152, an output terminal 154, and an image updater (image updating means) 156.

A bit stream generated by the moving picture encoding apparatus 10 is fed to the input terminal 142. The bit stream is then fed from the input terminal 142 to the variable length decoder 144.

The variable length decoder 144 receives the bit stream fed via line L40 and performs variable length decoding of encoded data included in the bit stream, to restore a motion vector and an encoded difference signal.

The decoder 146 executes a process similar to that by the decoder 28 in the moving picture encoding apparatus 10. The decoder 146 has a dequantizer 160 similar to the dequantizer 38, and an inverse transformer 162 similar to the inverse transformer 40, receives an encoded difference signal via line L42, and generates a decoded difference image from the encoded difference signal.

The predicted image generator 148 generates a predicted image by motion-compensated prediction similar to that by the predicted image generator 16 in the moving picture encoding apparatus 10. Specifically, the predicted image generator 148 generates a predicted image, using a motion vector fed via line L44 and a reference image stored in the frame memory 150, fed via line L46. Here the frame memory 150 stores an image based on a reproduced image generated with respect to an image as an object to be decoded prior to a target image as an object to be decoded, as a reference image, out of images constituting a moving picture.

The reproduced image generator 152 performs a summation of a decoded difference image fed via line L48 from the decoder 146 and a predicted image fed via line L50 from the predicted image generator 148, to generate a reproduced image. This reproduced image is outputted via line L52 to the output terminal 154 and is also stored into the frame memory 150.

The image updater 156 has a configuration similar to the image updater 32 of the moving picture encoding apparatus 10. The image updater 156 receives a reproduced image fed via line L54 and a reference image fed via line L56. The image updater 156 defines one of the reproduced image and the reference image as a first image, defines the other of the reproduced image and the reference image as a second image, and performs a weighted summation of the first image and the second image to generate an updated image. This updated image is stored via line L58 into the frame memory 150 and is used as a reference image in decoding of a different target image. This weighted summation is to apply weights at an arbitrary ratio to the first image and the second image to keep pixel values after the summation within a desired level.

The updated image generated by the image updater 156 is stored into the frame memory 150 and is used by the predicted image generator 148, as a reference image for generation of a predicted image with respect to an image as an object to be decoded after the target image of interest, out of the images forming the moving picture.

The image updater 48 shown in FIG. 2 can also be applied as the image updater 156 to the moving picture decoding apparatus 140. In the case of the moving picture decoding apparatus 140, line L70 shown in FIG. 2 corresponds to line L54, line L72 corresponds to line L56, and line L74 corresponds to line L58. The details of the image updater 48 were described above, and as to the description of the details, reference should be made to the description of the image updater 48 in the present specification.

The moving picture decoding apparatus 140 may further comprise a controller 158. The controller 158 functions as follows: when the aforementioned update control signal is included in the bit stream generated by the moving picture encoding apparatus 10, the controller 158 receives the update control signal via line L60 from the variable length decoder 144. The controller 158 controls the generation of the updated image in the image updater 156 via line L62, according to a state of the aforementioned update control signal.

Figure 12:
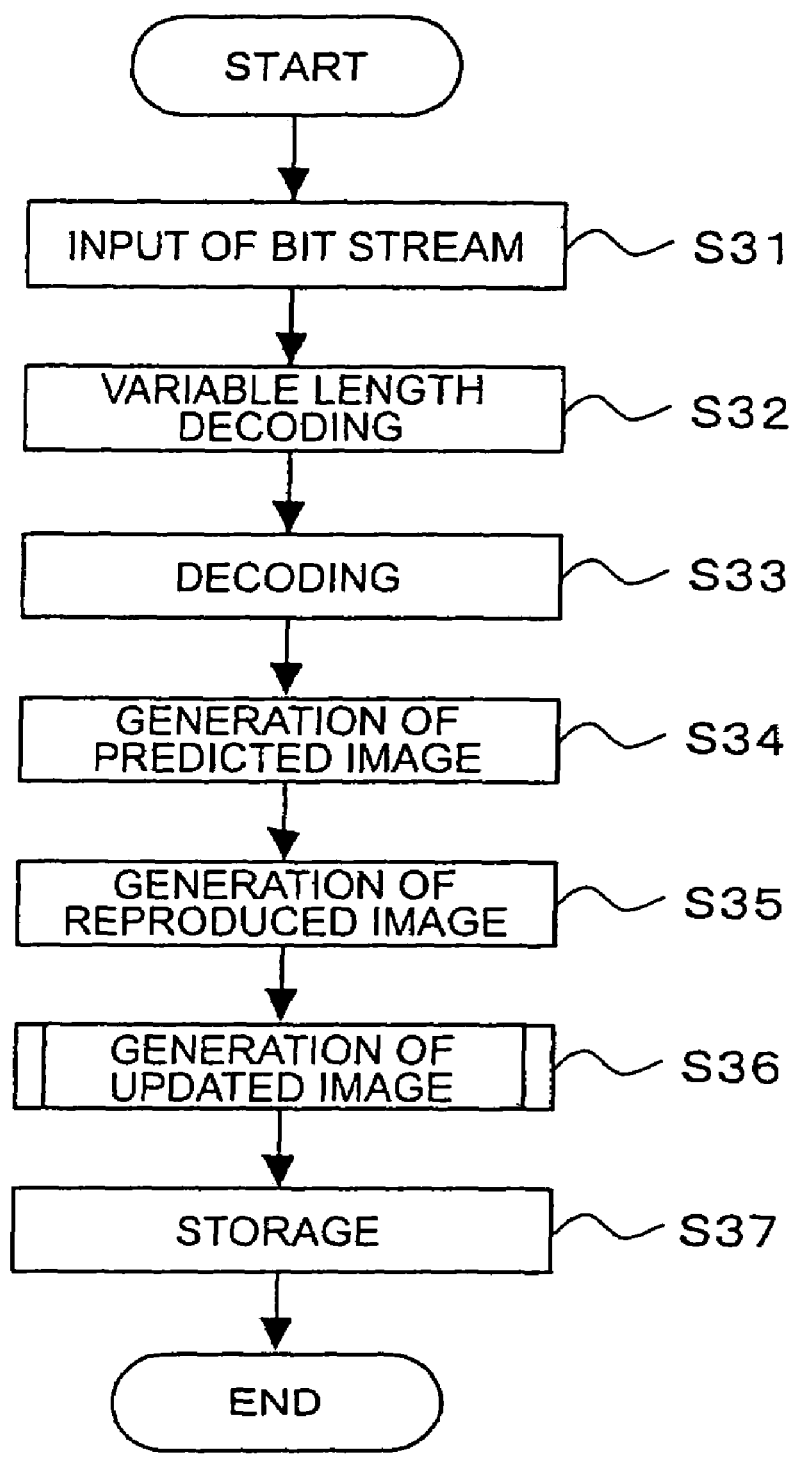
FIG. 12 is a flowchart showing a moving picture decoding method according to an embodiment of the present invention.

The operation of the moving picture decoding apparatus 140 will be described below. In addition, a moving picture decoding method according to an embodiment of the present invention will be described. FIG. 12 is a flowchart showing the moving picture decoding method according to the embodiment of the present invention.

In this moving picture decoding method, as shown in FIG. 12, the first step is to receive a bit stream at the input terminal 142 (step S31). The variable length decoder 144 performs the variable length decoding of encoded data included in the bit stream to generate a motion vector and an encoded difference signal (step S32).

Next, the decoder 146 generates a decoded difference image from the encoded difference signal (step S33). The predicted image generator 148 uses the motion vector and a reference image stored in the frame memory 150, to generate a predicted image (step S34).

Next, the reproduced image generator 152 performs a summation of the decoded difference image and the predicted image to generate a reproduced image (step S35).

Then the image updater 156 uses the reproduced image and the reference image stored in the frame memory 150, to generate an updated image (step S36). The generation of the updated image is similar to that described with FIGS. 6 and 7, and the detailed description thereof is omitted herein.

Then the updated image generated by the image updater 156 is stored into the frame memory 150 (step S37) and is used as a reference image in decoding of a different target image.

Figure 13:
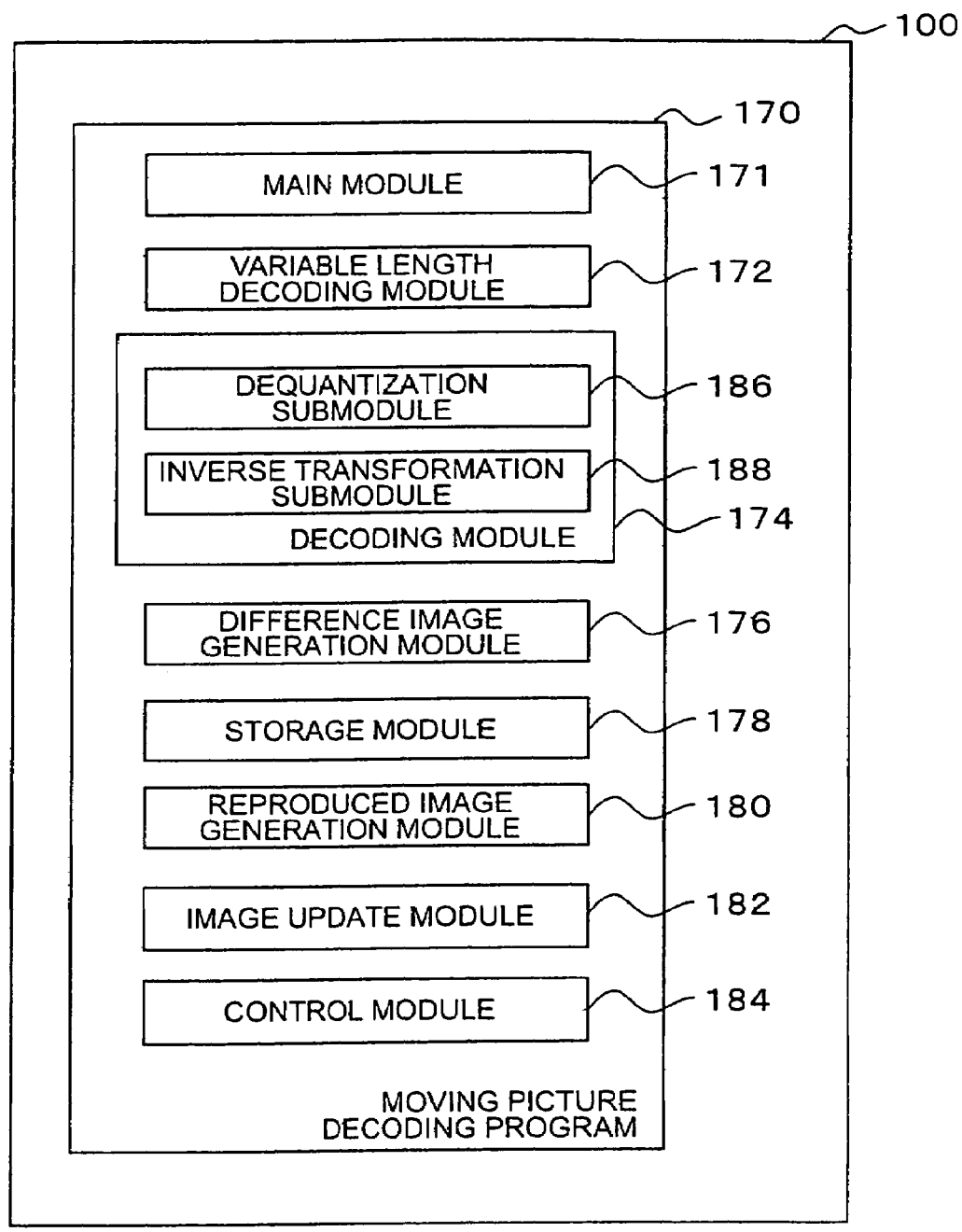
FIG. 13 is an illustration showing a configuration of a moving picture decoding program according to an embodiment of the present invention, together with a recording medium.

A moving picture decoding program according to an embodiment of the present invention will be described below. FIG. 13 is an illustration showing a configuration of the moving picture decoding program according to the embodiment of the present invention, together with a recording medium.

As shown in FIG. 13, the moving picture decoding program 170 is provided as stored in a recording medium 100. Examples of the recording medium 100 include recording media such as a flexible disk, CD-ROM, DVD, or ROM, semiconductor memories, and so on.

When the moving picture decoding program 170 is set in the reading device 112 of the computer 110 shown in FIGS. 9 and 10, the computer 110 becomes accessible to the moving picture decoding program 170 stored in the recording medium 100. The moving picture decoding program 170 enables the computer 110 to act as the moving picture decoding apparatus 140. As shown in FIG. 10, the moving picture decoding program 170 may be a program provided through a network in the form of a computer data signal 130 superimposed on a carrier wave. In this case, the computer 110 stores the moving picture decoding program 170 received by the communication device 124, into the memory 116 and becomes ready to execute the moving picture decoding program 170.

As shown in FIG. 13, the moving picture decoding program 170 is composed of a main module 171 controlling the processing, a variable length decoding module 172, a decoding module 174, a predicted image generation module 176, a storage module 178, a reproduced image generation module 180, and an image update module 182. The decoding module 174 has a dequantization submodule 186 and an inverse transformation submodule 188.

The functions implemented by the computer on the basis of the variable length decoding module 172, decoding module 174, predicted image generation module 176, storage module 178, reproduced image generation module 180, image update module 182, dequantization submodule 186, and inverse transformation submodule 188 are similar to those by the associated elements of the aforementioned variable length decoder 144, decoder 146, predicted image generator 148, frame memory 150, reproduced image generator 152, image updater 156, dequantizer 160, and inverse transformer 162, respectively. The moving picture decoding program 170 can further have a control-module 184 to make the computer 110 implement the function corresponding to the aforementioned controller 158.

The action and effect of the moving picture encoding apparatus 10 and the moving picture decoding apparatus 140 according to the present embodiment will be described below. The moving picture encoding apparatus 10 is configured to perform the weighted summation of the first image which is one of the reproduced image and the reference image previously stored in the frame memory 20, and the second image which is the other of the reproduced image and the reference image, to generate the updated image. This updated image is used as a reference image for generating a predicted image with respect to a different target image. Therefore, the apparatus uses the reference image in which noise is reduced by averaging based on the summation, so as to reduce the data volume of the moving picture by encoding, thereby increasing the encoding efficiency. Furthermore, the moving picture encoding apparatus 10 is configured to generate the updated image resulting from averaging of the reproduced image and the reference image, whereby the updated image can reflect the details of the image, which are absent in the reproduced image or in the reference image. Therefore, the data volume of the moving picture by encoding is further reduced.

The moving picture decoding apparatus 140 is able to faithfully restore the moving picture from the bit stream generated by the moving picture encoding apparatus 10.

The moving picture encoding apparatus 10 and the moving picture decoding apparatus 140 can be configured to generate the updated image only in a case effective for improvement in the encoding efficiency of the moving picture, based on a scene change in the moving picture as described above. In this case, as described above, the apparatus can use the update control signal capable of indicating a command about whether the updated image is to be generated, by the minimum bit count.

Since in the moving picture decoding apparatus 140 the image updater generates the updated image by obtaining the motion amount indicating the deviation of the second image relative to the first image, the moving picture encoding apparatus 10 does not have to transmit the motion amount (motion vector) for generation of the updated image, to the moving picture decoding apparatus 140. Therefore, the data volume of the bit stream to be transmitted by the moving picture encoding apparatus 10 is further reduced.

In the moving picture encoding apparatus 10 and the moving picture decoding apparatus 140, in the case of the forward prediction, smoothing is implemented without need for rearrangement of images, whereby noise is reduced in the reference image.

It is noted that the present invention is by no means intended to be limited to the specific configurations described in the present embodiment. For example, the moving picture encoding apparatus 10 and the moving picture decoding apparatus 140 are configured to use the image stored in the frame memory and referred to for generation of the predicted image, as a reference image, but an image used in the aforementioned image update but not used in the generation of the predicted image may be used as a reference image. This reference image may be stored in the aforementioned frame memory of the moving picture encoding apparatus 10 and the moving picture decoding apparatus 140, or may be stored in another frame memory different from the mentioned frame memory. The reference image may be transmitted as a file or a bit stream different from the aforementioned bit stream containing the data based on the encoded difference signal.

The moving picture encoding apparatus 10 and the moving picture decoding apparatus 140 are configured to perform the image update using the reference image stored in the frame memory and the reproduced image, but the image update may also be carried out using images stored in the frame memory. Namely, the moving picture encoding apparatus 10 and the moving picture decoding apparatus 140 are configured to perform the image update prior to the storage of the reproduced image into the frame memory, but the apparatus may also be configured to first store the reproduced image as a reference image into the frame memory and thereafter perform the image update process using the reference image, and another reference image different from the foregoing reference image.

Incidentally, the above described the embodiment wherein the image stored in the frame memory of the moving picture encoding apparatus 10 and the moving picture decoding apparatus 140 was updated using the reproduced image or another image stored in the frame memory, but it is also possible to update the image stored in the frame memory by use of the decoded difference image. Modification examples of this type will be described in detail with reference to FIGS. 14 to 16.

Figure 14:
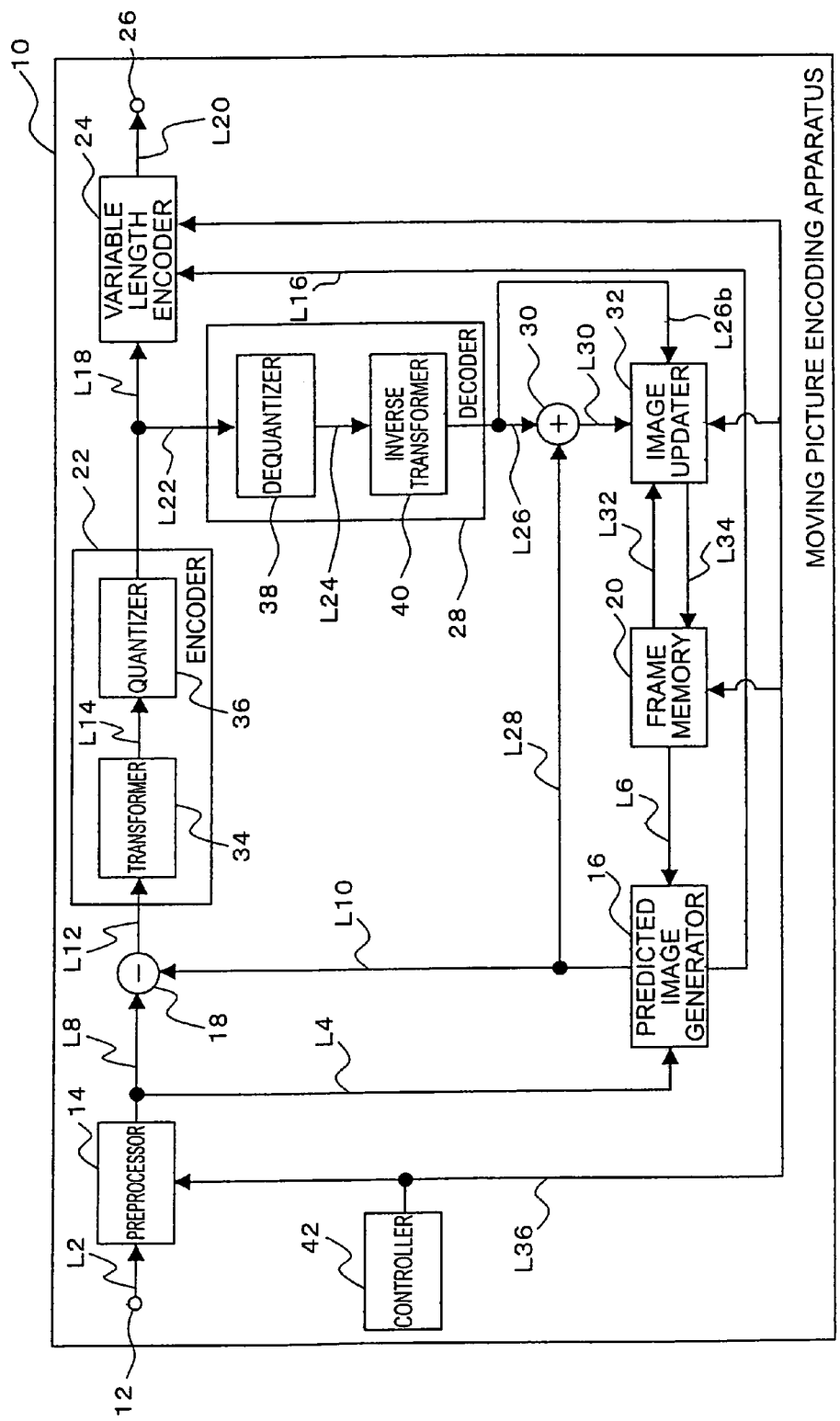
FIG. 14 is an illustration showing a modification example of the configuration of the moving picture encoding apparatus according to an embodiment of the present invention.

FIG. 14 is a configuration diagram showing a modification of the moving picture encoding apparatus according to the present invention. The fundamental configuration and functions are the same as in FIG. 1, but a decoded difference image as an output from the decoder 28 is fed via line L26b to the image updater 32, in addition to the reproduced image from the reproduced image generator 30 and the reference image from the frame memory 20. The image updater 32 defines the decoded difference image as a first image, defines the reference image as a second image, and performs a weighted summation of the first image and the second image to generate an updated image. This updated image is stored into the frame memory 20 and used in encoding of a different target image. Since the image update involves the motion compensation as described with FIG. 2, the motion information is needed. In the present embodiment, the motion information is provided by the predicted image generator 16 of FIG. 14. The image updater 32 will be described in detail with reference to FIG. 15. The weighted summation can use negative values of weights, and in that case the process is a subtraction process.

Figure 15:
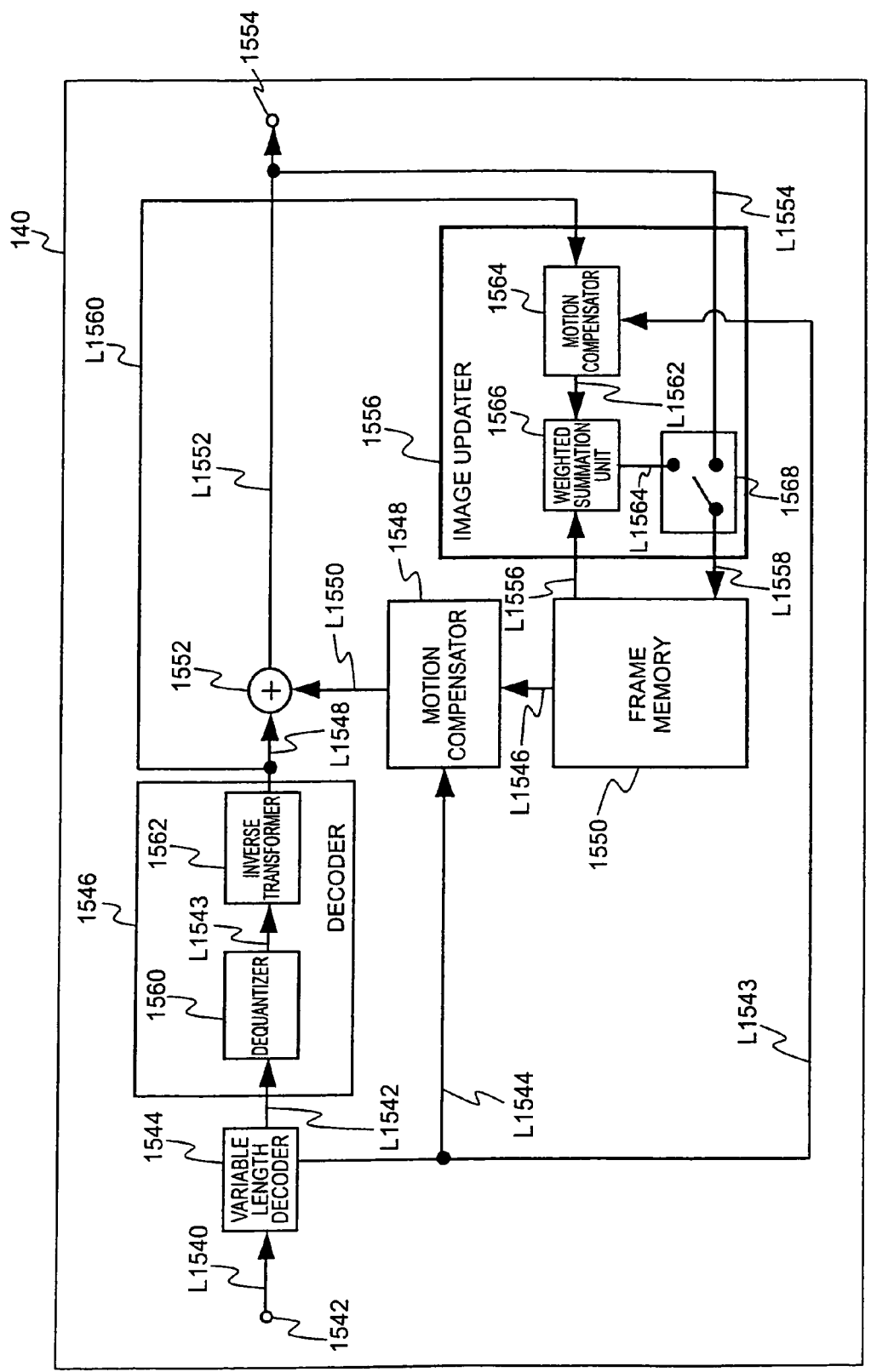
FIG. 15 is an illustration showing a first modification example of the configuration of the moving picture decoding apparatus according to an embodiment of the present invention.

FIG. 15 is an illustration showing a configuration of a moving picture decoding apparatus corresponding to the moving picture encoding apparatus of FIG. 14. The moving picture decoding apparatus 140 shown in FIG. 15 is an apparatus capable of reproducing a moving picture from a bit stream generated by the moving picture encoding apparatus 10 of FIG. 14. The fundamental configuration and functions are the same as in FIG. 11, but the image updater 1556 receives a decoded difference image as an output from the decoder 1546 via line L1560, in addition to a reproduced image fed via line L1554 and a reference image fed via line L1556. The image updater 1556 defines the decoded difference image (fed via line L1560) as a first image, defines the reference image (fed via line L1556) as a second image, and performs a weighted summation of the first image and the second image to generate an updated image. This updated image is stored into the frame memory 1550 and used in a subsequent decoding operation.

Specifically, a motion compensator 1564 subjects the decoded difference image fed via line L1560, to a motion compensation process, based on motion information fed via line L1543 from the variable length decoder 1544. The result is fed via line L1562 to a weighted summation unit 1566 and the weighted summation unit 1566 performs a weighted summation of the result with the reference image fed from frame memory 1550. In the present embodiment, a negative weight is given to the output from the motion compensator 1564 and the weighted output is added to the reference image. The output from the weighted summation unit 1566 is fed via switch 1568 back to the frame memory 1550. On the other hand, the reproduced image from the reproduced image generator 1552 is also stored via switch 1568 into the frame memory 1550. In this manner, the reference image stored in the frame memory is updated based on the decoded difference image.

Figure 16:
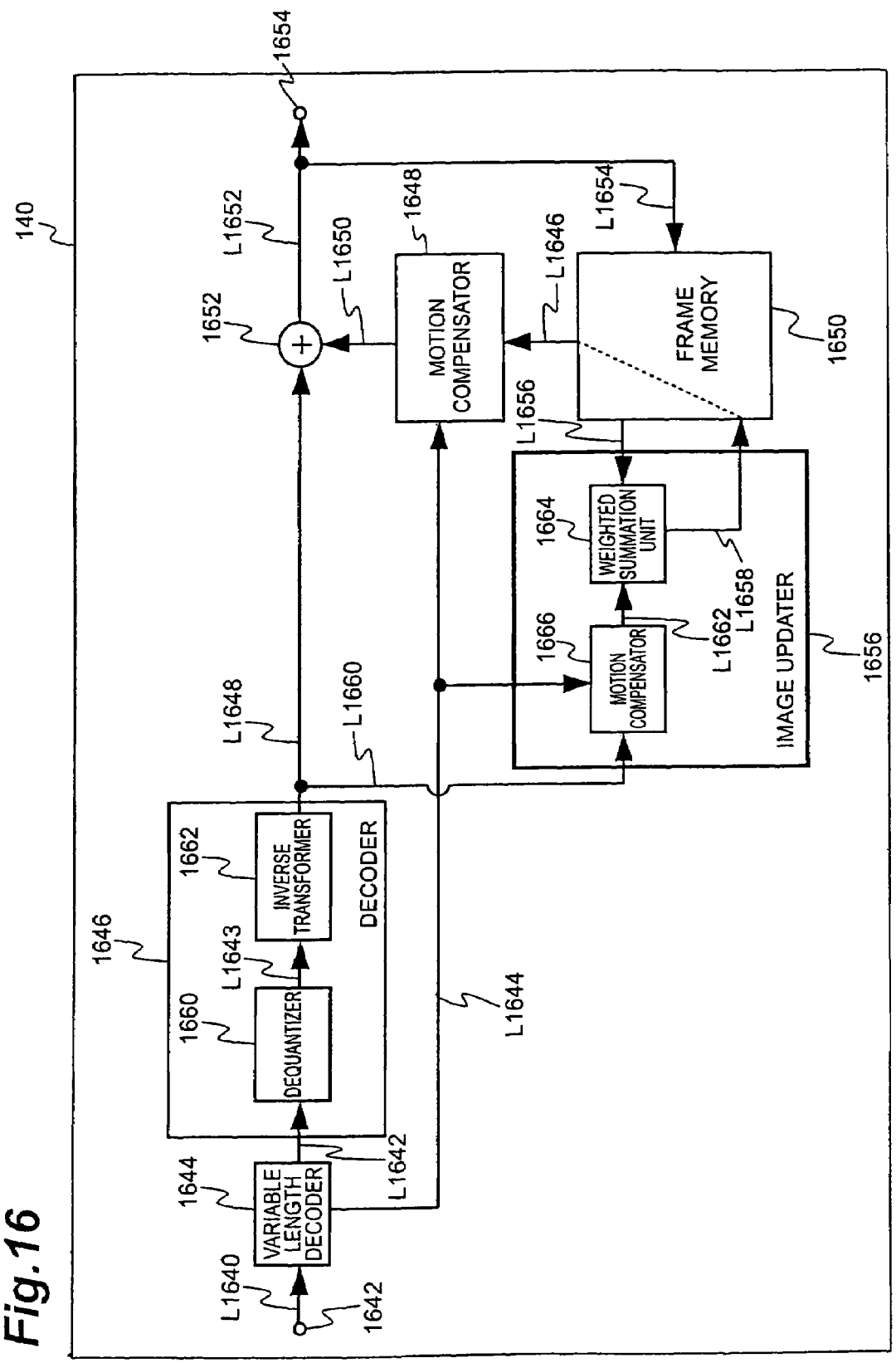
FIG. 16 is an illustration showing a second modification example of the configuration of the moving picture decoding apparatus according to an embodiment of the present invention.

FIG. 16 is an illustration showing another configuration of a moving picture decoding apparatus corresponding to the moving picture encoding apparatus of FIG. 14. As shown in FIG. 16, the moving picture decoding apparatus 140 is functionally composed of an input terminal 1642, a variable length decoder 1644, a decoder (decoding means) 1646, a motion compensator (predicted image generating means) 1648, a frame memory (storing means) 1650, a reproduced image generator (reproduced image generating means) 1652, an output terminal 1654, and an image updater (image updating means) 1656.

A bit stream generated by the moving picture encoding apparatus 10 of FIG. 14 is fed to the input terminal 1642. The bit stream is then fed from the input terminal 1642 to the variable length decoder 1644. The variable length decoder 1644 receives the bit stream fed via line L1640 and performs the variable length decoding of encoded data included in the bit stream, to restore a motion vector and an encoded difference signal.

The decoder 1646 has a dequantizer 1660 and an inverse transformer 1662, receives an encoded difference signal via line L1642, and generates a decoded difference image from the encoded difference signal.

The image updater 1656 receives a decoded difference image fed via line L1660 and a reference image fed via line L1656. The image updater 1656 defines the decoded difference image as a first image, defines the reference image as a second image, and performs a weighted summation of the first image and the second image to generate an updated image. Specifically, a motion compensator 1666 subjects the decoded difference image fed via line L1660, to a motion compensation process, based on motion information fed via line L1644. The result is sent via line L1662 to a weighted summation unit 1664, the weighted summation unit 1664 performs a weighted summation of the result with the reference image fed from frame memory 1650. In the present embodiment a negative weight is given to the output from the motion compensator 1666, and the weighted output is added to the reference image. The updated image as an output from the weighted summation unit 1664 is stored via line L1658 into the frame memory 1650 and is also used in the motion compensator described below.

The motion compensator 1648 generates a predicted image, using a motion vector fed via line L1644 and a reference image stored in the frame memory 1650, fed via line L1646. Here the frame memory 1650 stores an image based on a reproduced image generated prior to a target image being a target to be decoded, as a reference image, out of images constituting a moving picture, and an updated image from the image updater 1656.

The reproduced image generator 1652 performs a summation of a decoded difference image fed via line L1648 from the decoder 1646 and a predicted image fed via line L1650 from the motion compensator 1648, to generate a reproduced image. This reproduced image is outputted via line L1652 to the output terminal 1654 and is also stored into the frame memory 1650.

The update of the reference image with the decoded difference image in this manner provides the effect of uniformly dispersing distortion due to quantization to the reference image and to the reproduced image, thereby enabling more efficient encoding.

In the present embodiment the decoded difference image was fed directly to the image updater, but it is also possible to adopt a configuration wherein the decoded difference image is once stored into the frame memory and the decoded difference image is read out of the frame memory to be used in the image update.

It is also possible to perform the encoding/decoding process based on switching between a state in which the function of the image updater is active and a state in which the function of the image updater is inactive. For example, in FIG. 16, it is possible to perform such a control that the image updater 1656 is activated with the motion compensator 1648 and the reproduced image generator 1652 being inactive and that in reverse the image updater 1656 is deactivated with the motion compensator 1648 and the reproduced image generator 1652 being active.

Figure 17:
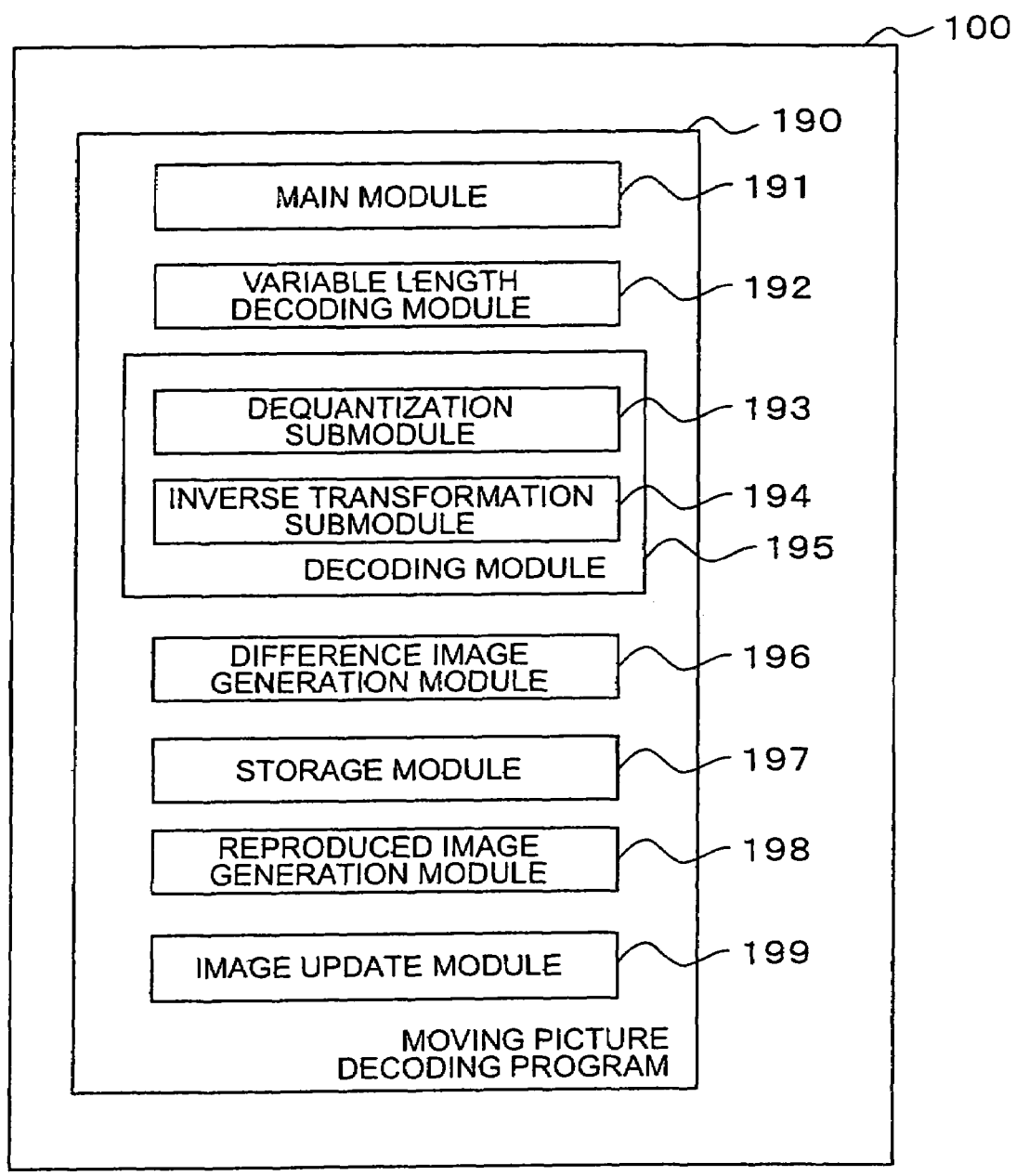
FIG. 17 is an illustration showing a modification example of the configuration of the moving picture decoding program according to an embodiment of the present invention, together with a recording medium.

A moving picture decoding program for letting a computer act as the moving picture decoding apparatus 140 shown in FIG. 15 or FIG. 16 will be described below. FIG. 17 is an illustration showing a configuration of the moving picture decoding program 190, together with a recording medium.

As shown in FIG. 17, the moving picture decoding program 190 is provided as stored in a recording medium 100. Examples of the recording medium 100 include recording media such as a flexible disk, CD-ROM, DVD, or ROM, semiconductor memories, and so on.

When the moving picture decoding program 190 is set in the reading device 112 of the computer 110 shown in FIGS. 9 and 10, the computer 110 becomes accessible to the moving picture decoding program 190 stored in the recording medium 100. The moving picture decoding program 190 enables the computer 110 to act as the moving picture decoding apparatus 140. As shown in FIG. 10, the moving picture decoding program 190 may be a program provided through a network in the form of a computer data signal 130 superimposed on a carrier wave. In this case, the computer 110 stores the moving picture decoding program 190 received by the communication device 124, into the memory 116, and then becomes ready to execute the moving picture decoding program 190.

As shown in FIG. 17, as a common configuration to the moving picture decoding program for letting the computer act as the moving picture decoding apparatus 140 of FIG. 15 and to the moving picture decoding program for letting the computer act as the moving picture decoding apparatus 140 of FIG. 16, the moving picture decoding program 190 has a main module 191 controlling the processing, a variable length decoding module 192, a decoding module 195, a predicted image generation module 196, a storage module 197, a reproduced image generation module 198, and an image update module 199. The decoding module 195 has a dequantization submodule 193 and an inverse transformation submodule 194.

Concerning the moving picture decoding program for letting the computer act as the moving picture decoding apparatus 140 of FIG. 15, the functions implemented by the computer on the basis of the variable length decoding module 192, decoding module 195, predicted image generation module 196, storage module 197, reproduced image generation module 198, and image update module 199 are similar to those by the associated elements of the aforementioned variable length decoder 1544, decoder 1546, motion compensator 1548, frame memory 1550, reproduced image generator 1552, and image updater 1556, respectively.

Concerning the moving picture decoding program for letting the computer act as the moving picture decoding apparatus 140 of FIG. 16, the functions implemented by the computer on the basis of the variable length decoding module 192, decoding module 195, predicted image generation module 196, storage module 197, reproduced image generation module 198, and image update module 199 are similar to those by the associated elements of the aforementioned variable length decoder 1644, decoder 1646, motion compensator 1648, frame memory 1650, reproduced image generator 1652, and image updater 1656, respectively.

A configuration of the moving picture encoding program for letting the computer act as the moving picture encoding apparatus 10 of FIG. 14 is similar to the aforementioned configuration of FIG. 8.

The moving picture encoding apparatus 10 and the moving picture decoding apparatus 140 are configured to use the updated image as a reference image, but, without having to be limited to this, the updated image may be outputted to the display device.

The principle of the present invention was illustrated and described above with the preferred embodiments thereof, but it is to be understood by those skilled in the art that the present invention can be modified in arrangement and details without departing from the principle of the invention. It is noted that the present invention is by no means limited to the specific configurations disclosed in the embodiments. Therefore, the Inventor claims the rights on all corrections and modifications falling within the scope of claims and within the scope of the spirit thereof.

The disclosure of Japanese Patent Application No. 2004-122100 filed Apr. 16, 2004 including specification, drawings and claims, and the disclosure of Japanese Patent Application No. 2005-026926 filed Feb. 2, 2005 including specification, drawings and claims are incorporated herein by reference in its entirety.

What is claimed is:

1. A moving picture encoding apparatus comprising:
predicted image generating means for generating a predicted image, with respect to a target image as an object to be encoded among a plurality of images constituting a moving picture;
difference image generating means for executing a difference operation between the target image and the predicted image to generate a difference image;
encoding means for encoding the difference image to generate an encoded difference signal;
decoding means for decoding the encoded difference signal to generate a decoded difference image;
reproduced image generating means for executing a sum operation of the decoded difference image and the predicted image to generate a reproduced image;
storing means for storing a reference image to be used by the predicted image generating means in order to generate the predicted image; and
image updating means for performing a weighted summation of a first image which is one of the reproduced image and the reference image stored in the storing means, and at least a portion of a second image which is the other of the reproduced image and the reference image, to generate an updated image,
wherein the image updating means stores the updated image into the storing means, and
wherein the predicted image generating means uses the updated image stored in the storing means, as a reference image for generating a predicted image with respect to another target image.

2. A moving picture encoding apparatus comprising:
predicted image generating means for generating a predicted image, with respect to a target image as an object to be encoded among a plurality of images constituting a moving picture;
difference image generating means for executing a difference operation between the target image and the predicted image to generate a difference image;
encoding means for encoding the difference image to generate an encoded difference signal;
decoding means for decoding the encoded difference signal to generate a decoded difference image;
reproduced image generating means for executing a sum operation of the decoded difference image and the predicted image to generate a reproduced image;
storing means for storing a reference image to be used by the predicted image generating means in order to generate the predicted image; and
image updating means for defining the reference image stored in the storing means, as a first image and defining at least one of a reference image different from the first image, stored in the storing means, the reproduced image, and the decoded difference image, as a second image, and for performing a weighted summation of the first image and at least a portion of the second image to generate an updated image,
wherein the image updating means stores the updated image into the storing means, and
wherein the predicted image generating means uses the updated image stored in the storing means, as the reference image for generating the predicted image.

3. The moving picture encoding apparatus according to claim 1, wherein the image updating means uses the reproduced image generated by the reproduced image generating means as the first image and uses the reference image stored in the storing means as the second image, and the image updating means performs a weighted summation of the reproduced image and at least a portion of the reference image to generate an updated reproduced image, and stores the updated reproduced image as the updated image into the storing means.

4. The moving picture encoding apparatus according to claim 1, wherein the image updating means uses the reference image stored in the storing means as the first image and uses the reproduced image generated by the reproduced image generating means as the second image, and the image updating means performs a weighted summation of the reference image and at least a portion of the reproduced image to generate an updated reference image, and stores the updated reference image as the updated image into the storing means.

5. The moving picture encoding apparatus according to claim 1, wherein the image updating means uses the reproduced image generated by the reproduced image generating means as the first image and uses the reference image stored in the storing means as the second image, and the image updating means performs a weighted summation of the reproduced image and at least a portion of the reference image to generate an updated reproduced image, and stores the updated reproduced image as the updated image into the storing means, wherein the image updating means uses the reference image stored in the storing means as the first image and uses the reproduced image generated by the reproduced image generating means as the second image, and the image updating means performs a weighted summation of the reference image and at least a portion of the reproduced image to generate an updated reference image, and stores the updated reference image as the updated image into the storing means, and
wherein the predicted image generating means uses at least one of the reproduced image, the updated reproduced image, the reference image, and the updated reference image, as a reference image for generating a predicted image with respect to another target image.

6. The moving picture encoding apparatus according to claim 1, wherein the image updating means obtains an amount of motion to specify a deviation of the second image relative to the first image, and performs a weighted summation of at least a portion of the second image at a corresponding position after movement based on the amount of motion, and the first image to generate the updated image.

7. A moving picture encoding method comprising:
generating a predicted image with respect to a target image as an object to be encoded among a plurality of images constituting a moving picture;
executing a difference operation between the target image and the predicted image to generate a difference image;
encoding the difference image to generate an encoded difference signal;
decoding the encoded difference signal to generate a decoded difference image;
performing a sum operation of the decoded difference image and the predicted image to generate a reproduced image;
storing, by a storage medium of a picture encoding apparatus, a reference image to be used in generating the predicted image; and
performing a weighted summation of a first image which is one of the reproduced image and the reference image stored by the storage medium, and at least a portion of a second image which is the other of the reproduced image and the reference image, to generate an updated image, wherein the image updating step includes storing the updated image in the storage medium, and the predicted image generating step includes using the updated image, stored in the storage medium, as a reference image for generating a predicted image with respect to another target image.

8. A computer-readable storage device, storing therein a moving picture encoding program, the program, when executed by a processing unit, configured to execute a method comprising:

a predicted image generating step wherein predicted image generating means generates a predicted image with respect to a target image as an object to be encoded among a plurality of images constituting a moving picture;

a difference image generating step wherein difference image generating means executes a difference operation between the target image and the predicted image to generate a difference image;

an encoding step wherein encoding means encodes the difference image to generate an encoded difference signal;

a decoding step wherein decoding means decodes the encoded difference signal to generate a decoded difference image;

a reproduced image generating step wherein reproduced image generating means executes a sum operation of the decoded difference image and the predicted image to generate a reproduced image;

a storing step wherein storing means stores a reference image to be used by the predicted image generating means in order to generate the predicted image; and an image updating step wherein image updating means performs a weighted summation of a first image which is one of the reproduced image and the reference image stored in the storing means, and at least a portion of a second image which is the other of the reproduced image and the reference image, to generate an updated image, wherein in the image updating step the image updating means stores the updated image into the storing means, and wherein in the predicted image generating step the predicted image generating means uses the updated image stored in the storing means, as a reference image for generating a predicted image with respect to another target image.

9. A moving picture encoding method comprising:

generating a predicted image with respect to a target image as an object to be encoded among a plurality of images constituting a moving picture;

executing a difference operation between the target image and the predicted image to generate a difference image;

encoding the difference image to generate an encoded difference signal;

decoding the encoded difference signal to generate a decoded difference image;

executing a sum operation of the decoded difference image and the predicted image to generate a reproduced image;

storing, by a storage medium of a picture encoding apparatus, a reference image to be used in generating the predicted image;

defining the reference image, stored in the storage medium, as a first image and defining at least one of a reference image, different from the first image stored in the storage medium, the reproduced image, and the decoded difference image, as a second image;

performing a weighted summation of the first image and at least a portion of the second image to generate an updated image, wherein the image updating step including storing the updated image into the storage medium, and the predicted image generating step including using the updated image, stored in the storage medium, as the reference image for generating the predicted image.

10. A computer-readable storage device, storing therein a moving picture encoding program, the program, when executed by a processing unit, configured to execute a method comprising:

a predicted image generating step wherein predicted image generating means generates a predicted image, with respect to a target image as an object to be encoded among a plurality of images constituting a moving picture;

a difference image generating step wherein difference image generating means executes a difference operation between the target image and the predicted image to generate a difference image;

an encoding step wherein encoding means encodes the difference image to generate an encoded difference signal;

a decoding step wherein decoding means decodes the encoded difference signal to generate a decoded difference image;

a reproduced image generating step wherein reproduced image generating means executes a sum operation of the decoded difference image and the predicted image to generate a reproduced image;

a storing step wherein storing means stores a reference image to be used by the predicted image generating means in order to generate the predicted image; and an image updating step wherein the image updating means defines the reference image stored in the storing means, as a first image and defines at least one of a reference image different from the first image, stored in the storing means, the reproduced image, and the decoded difference image, as a second image, and wherein the image updating means performs a weighted summation of the first image and at least a portion of the second image to generate an updated image, wherein in the image updating step the image updating means stores the updated image into the storing means, and wherein in the predicted image generating step the predicted image generating means uses the updated image stored in the storing means, as the reference image for generating the predicted image.

11. A moving picture decoding apparatus comprising:

decoding means for decoding an encoded difference signal resulting from predictive coding of a moving picture, to generate a decoded difference image;

predicted image generating means for generating a predicted image with respect to a target image as an object to be decoded, based on the encoded difference signal;

reproduced image generating means for performing a summation of the decoded difference image and the predicted image to generate a reproduced image;

storing means for storing a reference image to be used by the predicted image generating means in order to generate the predicted image; and image updating means for performing a weighted summation of a first image which is one of the reproduced image and the reference image stored in the storing means, and at least a portion of a second image which is the other of the reproduced image and the reference image, to generate an updated image, wherein the image updating means stores the updated image into the storing means, and wherein the predicted image generating means uses the updated image stored in the storing means, as a reference image for generating a predicted image with respect to another target image.

12. A moving picture decoding apparatus comprising:

decoding means for decoding an encoded difference signal resulting from predictive coding of a moving picture, to generate a decoded difference image;

predicted image generating means for generating a predicted image with respect to a target image as an object to be decoded, based on the encoded difference signal;

reproduced image generating means for performing a summation of the decoded difference image and the predicted image to generate a reproduced image;

storing means for storing a reference image to be used by the predicted image generating means in order to generate the predicted image; and image updating means for defining the reference image stored in the storing means, as a first image and defining at least one of a reference image different from the first image, stored in the storing means, the reproduced image, and the decoded difference image, as a second image, and for performing a weighted summation of the first image and at least a portion of the second image to generate an updated image, wherein the image updating means stores the updated image into the storing means, and wherein the predicted image generating means uses the updated image stored in the storing means, as the reference image for generating the predicted image.

13. The moving picture decoding apparatus according to claim 11, wherein the image updating means uses the reproduced image generated by the reproduced image generating means as the first image and uses the reference image stored in the storing means as the second image, and the image updating means performs a weighted summation of the reproduced image and at least a portion of the reference image to generate an updated reproduced image, and stores the updated reproduced image as the updated image into the storing means.

14. The moving picture decoding apparatus according to claim 11, wherein the image updating means uses the reference image stored in the storing means as the first image and uses the reproduced image generated by the reproduced image generating means as the second image, and the image updating means performs a weighted summation of the reference image and at least a portion of the reproduced image to generate an updated reference image, and stores the updated reference image as the updated image into the storing means.

15. The moving picture decoding apparatus according to claim 11, wherein the image updating means uses the reproduced image generated by the reproduced image generating means as the first image and uses the reference image stored in the storing means as the second image, and the image updating means performs a weighted summation of the reproduced image and at least a portion of the reference image to generate an updated reproduced image, and stores the updated reproduced image as the updated image into the storing means, wherein the image updating means uses the reference image stored in the storing means as the first image and uses the reproduced image generated by the reproduced image generating means as the second image, and the image updating means performs a weighted summation of the reference image and at least a portion of the reproduced image to generate an updated reference image, and stores the updated reference image as the updated image into the storing means, and wherein the predicted image generating means uses at least one of the reproduced image, the updated reproduced image, the reference image, and the updated reference image, as a reference image for generating a predicted image with respect to another target image.

16. The moving picture decoding apparatus according to claim 15, wherein the encoded difference signal contains an update control signal to indicate at least one of a first state, a second state, a third state, and a fourth state, and wherein the image updating means generates the updated reproduced image when the update control signal indicates the first state, the image updating means generates the updated reference image when the update control signal indicates the second state, the image updating means generates the updated reproduced image and the updated reference image when the update control signal indicates the third state, and the image updating means generates neither the updated reproduced image nor the updated reference image when the update control signal indicates the fourth state.

17. The moving picture decoding apparatus according to claim 11, wherein the image updating means obtains an amount of motion to specify a deviation of the second image relative to the first image, and performs a weighted summation of at least a portion of the second image at a corresponding position after movement based on the amount of motion, and the first image to generate the updated image.

18. A moving picture decoding method comprising:

decoding an encoded difference signal resulting from predictive coding of a moving picture, to generate a decoded difference image;

generating a predicted image with respect to a target image as an object to be decoded, based on the encoded difference signal;

performing a summation of the decoded difference image and the predicted image to generate a reproduced image;

storing, by a storage medium of a picture decoding apparatus, a reference image used to generate the predicted image; and performing a weighted summation of a first image which is one of the reproduced image and the reference image stored in the storage medium, and at least a portion of a second image which is the other of the reproduced image and the reference image, to generate an updated image, wherein the image updating step includes storing the updated image into the storage medium, and the predicted image generating step includes using the updated image, stored in the storage medium, as a reference image for generating a predicted image with respect to another target image.

19. A computer-readable storage device, storing therein a moving picture decoding program, the program, when executed by a processing unit, configured to execute a method comprising:

a decoding step wherein decoding means decodes an encoded difference signal resulting from predictive coding of a moving picture, to generate a decoded difference image;

a predicted image generating step wherein predicted image generating means generates a predicted image with respect to a target image as an object to be decoded, based on the encoded difference signal;

a reproduced image generating step wherein reproduced image generating means performs a summation of the decoded difference image and the predicted image to generate a reproduced image;

a storing step wherein storing means stores a reference image to be used by the predicted image generating means in order to generate the predicted image; and an image updating step wherein image updating means performs a weighted summation of a first image which is one of the reproduced image and the reference image stored in the storing means, and at least a portion of a second image which is the other of the reproduced image and the reference image, to generate an updated image, wherein in the image updating step the image updating means stores the updated image into the storing means, and wherein in the predicted image generating step the predicted image generating means uses the updated image stored in the storing means, as a reference image for generating a predicted image with respect to another target image.

20. A moving picture decoding method comprising:

decoding an encoded difference signal resulting from predictive coding of a moving picture, to generate a decoded difference image;

generating a predicted image with respect to a target image as an object to be decoded, based on the encoded difference signal;

performing a summation of the decoded difference image and the predicted image to generate a reproduced image;

storing, by a storage medium of a picture decoding apparatus, a reference image to be used to generate the predicted image;

defining the reference image, stored in the storing means, as a first image and defining at least one of a reference image, different from the first image stored in the storage medium, the reproduced image, and the decoded difference image, as a second image; and performing a weighted summation of the first image and at least a portion of the second image to generate an updated image, wherein the image updating step includes storing the updated image into the storage medium, and the predicted image generating step includes using the updated image, stored in the storage medium, as the reference image for generating the predicted image.

21. A computer-readable storage device, storing therein a moving picture decoding program, the program, when executed by a processing unit, configured to execute a method comprising:

a decoding step wherein decoding means decodes an encoded difference signal resulting from predictive coding of a moving picture, to generate a decoded difference image;

a predicted image generating step wherein predicted image generating means generates a predicted image with respect to a target image as an object to be decoded, based on the encoded difference signal;

a reproduced image generating step wherein reproduced image generating means performs a summation of the decoded difference image and the predicted image to generate a reproduced image;

a storing step wherein storing means stores a reference image to be used by the predicted image generating means in order to generate the predicted image; and an image updating step wherein image updating means defines the reference image stored in the storing means, as a first image and defines at least one of a reference image different from the first image, stored in the storing means, the reproduced image, and the decoded difference image, as a second image, and performs a weighted summation of the first image and at least a portion of the second image to generate an updated image, wherein in the image updating step the image updating means stores the updated image into the storing means, and wherein in the predicted image generating step the predicted image generating means uses the updated image stored in the storing means, as the reference image for generating the predicted image.

* * * * *